(12) United States Patent
Chen et al.

(10) Patent No.: US 10,177,852 B2
(45) Date of Patent: Jan. 8, 2019

(54) METHOD AND APPARATUS FOR AUTOMATICALLY CONTROLLING BIAS VOLTAGE OF OPTICAL MODULATOR

(71) Applicant: PLUGTECH PRECISION SYSTEMS LIMITED (SHENZHEN), Shenzhen (CN)

(72) Inventors: Yuqi Chen, Hong Kong (CN); Bing Fang, Hong Kong (CN); Yongzhan Zhao, Hong Kong (CN)

(73) Assignee: PLUGTECH PRECISION SYSTEMS LIMITED (SHENZHEN), Shenzhen (CN)

( * ) Notice: Subject to any disclaimer, the term of this patent is extended or adjusted under 35 U.S.C. 154(b) by 0 days.

(21) Appl. No.: 15/570,770

(22) PCT Filed: May 4, 2015

(86) PCT No.: PCT/CN2015/078197
§ 371 (c)(1),
(2) Date: Oct. 31, 2017

(87) PCT Pub. No.: WO2016/176803
PCT Pub. Date: Nov. 10, 2016

(65) Prior Publication Data
US 2018/0123698 A1 May 3, 2018

(51) Int. Cl.
*H04B 10/556* (2013.01)
*H04B 10/516* (2013.01)
(Continued)

(52) U.S. Cl.
CPC ..... *H04B 10/5161* (2013.01); *H04B 10/5053* (2013.01); *H04B 10/5057* (2013.01);
(Continued)

(58) Field of Classification Search
CPC .............. H04B 10/5161; H04B 10/564; H04B 10/541; H04B 10/556
See application file for complete search history.

(56) References Cited

U.S. PATENT DOCUMENTS

2007/0122161 A1   5/2007   Charlet et al.
2009/0092401 A1   4/2009   Sekine et al.
(Continued)

FOREIGN PATENT DOCUMENTS

AT         390768 T      4/2008
CA       101800598 A     8/2010
(Continued)

OTHER PUBLICATIONS

International Search Report dated Jul. 28, 2015; PCT/CN2015/078197.

*Primary Examiner* — Dzung D Tran
(74) *Attorney, Agent, or Firm* — Na Xu; IPro, PLLC

(57) ABSTRACT

The present disclosure discloses a method and an apparatus for automatically controlling a bias voltage of an optical modulator. The method includes: calculating a new Q bias voltage based on an acquired Q reference phase, a Q harmonic phase, a Q harmonic amplitude, a Q bias voltage and a Q error feedback coefficient, calculating a new I bias voltage based on an I reference phase, an I harmonic phase, an I harmonic amplitude, an I bias voltage and an I error feedback coefficient, and calculating a new P bias voltage based on a P reference phase, a P harmonic phase, a P harmonic amplitude, a P bias voltage and a P error feedback coefficient.

16 Claims, 6 Drawing Sheets

(51) Int. Cl.
*H04B 10/54* (2013.01)
*H04B 10/564* (2013.01)
*H04B 10/50* (2013.01)

(52) U.S. Cl.
CPC ..... *H04B 10/50575* (2013.01); *H04B 10/541* (2013.01); *H04B 10/556* (2013.01); *H04B 10/564* (2013.01)

(56) References Cited

U.S. PATENT DOCUMENTS

| | | | | |
|---|---|---|---|---|
| 2009/0115544 | A1* | 5/2009 | Kershteyn | H04L 27/2075 332/103 |
| 2011/0013907 | A1* | 1/2011 | Sugihara | G02F 1/0123 398/38 |
| 2013/0148981 | A1* | 6/2013 | Yasuda | H04B 10/50575 398/185 |
| 2014/0010533 | A1* | 1/2014 | Yan | H04B 10/564 398/38 |
| 2014/0168741 | A1* | 6/2014 | Li | G02F 1/0123 359/239 |
| 2015/0270905 | A1* | 9/2015 | Rasmussen | H04B 10/541 398/186 |
| 2017/0117961 | A1* | 4/2017 | Yoneyama | H04B 10/50575 |

FOREIGN PATENT DOCUMENTS

| | | |
|---|---|---|
| CN | 1972161 A | 5/2007 |
| CN | 101399613 A | 4/2009 |
| CN | 101634759 A | 1/2010 |
| CN | 102201868 A | 9/2011 |
| CN | 103873152 A | 6/2014 |
| CN | 104485997 A | 4/2015 |
| CN | 104699155 A | 6/2015 |
| DE | 602005005697 T2 | 4/2009 |
| EP | 1791274 A1 | 5/2007 |
| EP | 2042913 A2 | 4/2009 |
| EP | 2148235 A1 | 1/2010 |
| JP | 2009081747 A | 4/2009 |

* cited by examiner

S2011

Respectively inputting a first predetermined voltage and a second predetermined voltage to the Q modulation module and the P phase shifting module, sequentially inputting a plurality of first scanning voltages to the I modulation module, acquiring output optical signals corresponding to the plurality of first scanning voltages, converting the output optical signals corresponding to the plurality of first scanning voltages into electrical signals corresponding to the plurality of first scanning voltages, extracting a plurality of first direct current components corresponding to the plurality of first scanning voltages from the electrical signals corresponding to the plurality of first scanning voltages, obtaining a first direct current component having a maximum value from the plurality of first direct current components as a first maximum direct current component, and obtaining a first direct current component having a minimum value from the plurality of first direct current components as a first minimum direct current component; and inputting a third predetermined voltage to the I modulation module, inputting the second predetermined voltage to the P phase shifting module, sequentially inputting a plurality of second scanning voltages to the Q modulation module, acquiring output optical signals corresponding to the plurality of second scanning voltages, converting the output optical signals corresponding to the plurality of second scanning voltages into electrical signals corresponding to the plurality of second scanning voltages, extracting a plurality of second direct current components corresponding to the plurality of second scanning voltages from the electrical signals corresponding to the plurality of second scanning voltages, obtaining a second direct current component having a maximum value from the plurality of second direct current components as a second maximum direct current component, and obtaining a second direct current component having a minimum value from the plurality of second direct current components as a second minimum direct current component

S2012

Inputting a first scanning voltage corresponding to the first maximum direct current component or a first scanning voltage corresponding to the first minimum direct current component to the I modulation module, inputting a second scanning voltage corresponding to the second maximum direct current component or a second scanning voltage corresponding to the second minimum direct current component to the Q modulation module, and inputting a plurality of third scanning voltages to the P phase shifting module

S2013

Acquiring output optical signals corresponding to the plurality of third scanning voltages, converting the output optical signals corresponding to the plurality of third scanning voltages into electrical signals corresponding to the plurality of third scanning voltages, and extracting a plurality of third direct current components corresponding to the plurality of third scanning voltages from the electrical signals corresponding to the plurality of third scanning voltages

S2014

Calculating the P dither amplitude and the initial P bias voltage with respect to the P phase shifting module based on the plurality of third direct current components

S2015

Inputting the first predetermined voltage to the Q modulation module, inputting a positive bisection bias voltage or a negative bisection bias voltage to the P phase shifting module, inputting a plurality of fourth scanning voltages to the I modulation module, acquiring output optical signals corresponding to the plurality of fourth scanning voltages, converting the output optical signals corresponding to the plurality of fourth scanning voltages into electrical signals corresponding to the plurality of fourth scanning voltages, extracting a plurality of fourth direct current components corresponding to the plurality of fourth scanning voltages from the electrical signals corresponding to the plurality of fourth scanning voltages, and calculating the I dither amplitude and the initial I bias voltage with respect to the I modulation module based on the plurality of fourth direct current components; and inputting the third predetermined voltage to the I modulation module, inputting a positive bisection bias voltage or a negative bisection bias voltage to the P phase shifting module, inputting a plurality of fifth scanning voltages to the Q modulation module, acquiring output optical signals corresponding to the plurality of fifth scanning voltages, converting the output optical signals corresponding to the plurality of fifth scanning voltages into electrical signals corresponding to the plurality of fifth scanning voltages, extracting a plurality of fifth direct current components corresponding to the plurality of fifth scanning voltages from the electrical signals corresponding to the plurality of fifth scanning voltages, and calculating the Q dither amplitude and the initial Q bias voltage with respect to the Q modulation module based on the plurality of fifth direct current components

FIG. 5

METHOD AND APPARATUS FOR AUTOMATICALLY CONTROLLING BIAS VOLTAGE OF OPTICAL MODULATOR

CROSS-REFERENCE TO RELATED APPLICATIONS

This application is a National Stage of International Application No. PCT/CN2015/078197, filed on May 4, 2015, titled "METHOD AND APPARATUS FOR AUTOMATICALLY CONTROLLING BIAS VOLTAGE OF OPTICAL MODULATOR", which is hereby incorporated by reference in its entirety.

TECHNICAL FIELD

The present disclosure relates to the technical field of optical signal modulation processing, and in particular, relates to a method and an apparatus for automatically controlling a bias voltage of an optical modulator.

BACKGROUND

An optical modulator is used to modulate radio frequency signals onto an optical carrier output by a laser to form output optical signals, wherein the optical modulator is widely applied in the fields of optical fiber communication and optical fiber sensing. To control the optical modulator at different working points, a bias voltage may be output to the optical modulator.

However, since the optical modulator is extremely sensitive to changes of the working environment, such as changes of temperature, changes of humidity, mechanical vibration and the like. Due to the changes of the working environment, the output curve of the optical modulator is shifted and hence the working points are shifted, and consequently the modulation effect may not be ensured. Therefore, bias voltages applied to the optical modulator needs to be changed based on the changes of the environment, which is referred to as the bias voltage control technology.

At present, an optical modulator includes an I modulation module, a Q modulation module, and a P phase shifting module. A method for controlling an optical modulator includes: 1) directly detecting a part of frequency components of the optical signals output by the optical modulator, and detecting power of the optical signals of which the frequency is less than 1 GHz and output by an IQ modulator to determine whether the IQ modulator operates at a suitable operating point; and 2) outputting orthogonal dither signals to the I modulation module and the Q modulation module, and detecting harmonic amplitude of the dither signals.

SUMMARY

An embodiment of the present disclosure is to provide a method for automatically controlling a bias voltage of an optical modulator, wherein the optical modulator includes an I modulation module, a Q modulation module and a P phase shifting module, the I modulation module and the Q modulation module being configured to parallelly receive an input optical signal, the P phase shifting module being connected in series to the Q modulation module, the optical signal being modulated by the Q modulation module being input to the P phase shifting module for modulation, the optical signal output by the P phase shifting module being combined with the optical signal output by the I modulation module and then being output;

wherein the method includes:

obtaining an I dither amplitude and an initial I bias voltage with respect to the I modulation module, a Q dither amplitude and an initial Q bias voltage with respect to the Q modulation module, and an initial P bias voltage with respect to the P phase shifting module;

obtaining an I reference phase and an I error feedback coefficient with respect to the I modulation module, a Q reference phase and a Q error feedback coefficient with respect to the Q modulation module, and a P reference phase and a P error feedback coefficient with respect to the P phase shifting module;

using the initial I bias voltage as an I bias voltage, using the initial P bias voltage as a P bias voltage, and using the initial Q bias voltage as a Q bias voltage;

inputting the I bias voltage and an I dither signal to the I modulation module, inputting the Q bias voltage and a Q dither signal to the Q modulation module, and inputting the P bias voltage to the P phase shifting module, wherein an amplitude of the I dither signal is the I dither amplitude, and an amplitude of the Q dither signal is the Q dither amplitude;

acquiring an output optical signal that is modulated by the I modulation module based on the I bias voltage, the I dither signal and an input I radio frequency signal, modulated by the Q modulation module based on the Q bias voltage, the Q dither signal and an input Q radio frequency signal, and modulated by the P phase shifting module based on the P bias voltage;

converting the output optical signal into an electrical signal;

acquiring an alternating current component from the electrical signal;

extracting an I harmonic component with respect to the I modulation module, a Q harmonic component with respect to the Q modulation module, and a P feedback signal with respect to the P phase shifting module from the alternating current component;

calculating an I harmonic amplitude and an I harmonic phase of the I harmonic component, a Q harmonic amplitude and a Q harmonic phase of the Q harmonic component, and a P feedback signal amplitude and a P feedback signal phase of the P feedback signal;

calculating a new I bias voltage based on the I harmonic phase and the I reference phase in combination with the I error feedback coefficient, the I bias voltage and the I harmonic amplitude, calculating a new Q bias voltage based on the Q harmonic phase and the Q reference phase in combination with the Q error feedback coefficient, the Q bias voltage and the Q harmonic amplitude, and calculating a new P bias voltage based on the P feedback signal phase and the P reference phase in combination with the P error feedback coefficient, the P bias voltage and the P feedback signal amplitude; and using the new I bias voltage as the I bias voltage, using the new Q bias voltage as the Q bias voltage, using the new P bias voltage as the P bias voltage, and returning to the step of inputting the I bias voltage and an I dither signal to the I modulation module, inputting the Q bias voltage and a Q dither signal to the Q modulation module, and inputting the P bias voltage to the P phase shifting module.

Another embodiment of the present disclosure is to provide an apparatus for automatically controlling a bias voltage of an IQ optical modulator, wherein the IQ optical modulator includes an I modulation module, a Q modulation module and a P phase shifting module, the I modulation module and the Q modulation module being configured to parallelly receive an input optical signal, the P phase shifting module being connected in series to the Q modulation module, the optical signal being modulated by the Q modulation module being input to the P phase shifting module for modulation, the optical signal output by the P phase shifting module being combined with the optical signal output by the I modulation module and then being output;

wherein the apparatus includes: a processor, an optical-electrical converter, a filter, and an output device; wherein the processor is configured to: obtain an I dither amplitude and an initial I bias voltage with respect to the I modulation module, a Q dither amplitude and an initial Q bias voltage with respect to the Q modulation module, and an initial P bias voltage with respect to the P phase shifting module; obtain an I reference phase and an I error feedback coefficient with respect to the I modulation module, a Q reference phase and a Q error feedback coefficient with respect to the Q modulation module, and a P reference phase and a P error feedback coefficient with respect to the P phase shifting module; use the initial I bias voltage as an I bias voltage, use the initial P bias voltage as a P bias voltage, and use the initial Q bias voltage as a Q bias voltage; and send the Q bias voltage, the I bias voltage and the P bias voltage to the output device;

the output device is configured to: input the I bias voltage and an I dither signal to the I modulation module, input the Q bias voltage and a Q dither signal to the Q modulation module, and input the P bias voltage to the P phase shifting module, wherein an amplitude of the I dither signal is the I dither amplitude, and an amplitude of the Q dither signal is the Q dither amplitude;

the optical-electrical converter is configured to: acquire, via a light splitter, an output optical signal that is modulated by the I modulation module based on the I bias voltage, the I dither signal and an input I radio frequency signal, modulated by the Q modulation module based on the Q bias voltage, the Q dither signal and an input Q radio frequency signal, and modulated by the P phase shifting module based on the P bias voltage, and convert the output optical signal into an electrical signal;

the filter is configured to extract an alternating current component from the electrical signal;

the processor is configured to extract an I harmonic component with respect to the I modulation module, a Q harmonic component with respect to the Q modulation module, and a P feedback signal with respect to the P phase shifting module from the alternating current component;

the processor is configured to: calculate an I harmonic amplitude and an I harmonic phase of the I harmonic component, a Q harmonic amplitude and a Q harmonic phase of the Q harmonic component, and a P feedback signal amplitude and a P feedback signal phase of the P feedback signal; calculate a new I bias voltage based on the I harmonic phase and the I reference phase in combination with the I error feedback coefficient, the I bias voltage and the I harmonic amplitude, calculate a new Q bias voltage based on the Q harmonic phase and the Q reference phase in combination with the Q error feedback coefficient, the Q bias voltage and the Q harmonic amplitude, and calculate a new P bias voltage based on the P feedback signal phase and the P reference phase in combination with the P error feedback coefficient, the P bias voltage and the P feedback signal amplitude; and use the new I bias voltage as the I bias voltage, use the new Q bias voltage as the Q bias voltage, use the new P bias voltage as the P bias voltage, and send the Q bias voltage, the I bias voltage and the P bias voltage to the output device, such that the output device inputs the I bias voltage and the I dither signal to the I modulation module, and inputs the Q bias voltage and the Q dither signal to the Q modulation module, and inputs the P bias voltage to the P phase shifting module.

In the embodiment of the present disclosure, after the I modulation module modulates the optical signal based on the I bias voltage, the I dither signal and the input I radio frequency signal, the Q modulation module modulates the optical signal based on the Q bias voltage, the Q dither signal and the input Q radio frequency signal, and the P phase shifting module modulates the optical signal based on the P bias voltage, the I harmonic phase and the I harmonic amplitude of the I harmonic component with respect to the I modulation module, the Q harmonic amplitude and the Q harmonic phase of the Q harmonic component with respect to the Q modulation module, and the P feedback signal amplitude and the P feedback signal phase of the P feedback signal with respect to the P phase shifting module are obtained; the new I bias voltage is calculated based on the I harmonic phase and the I reference phase in combination with the I error feedback coefficient, the I bias voltage and the I harmonic amplitude; the new Q bias voltage is calculated based on the Q harmonic phase and the Q reference phase in combination with the Q error feedback coefficient, the Q bias voltage and the Q harmonic amplitude; and the new P bias voltage is calculated based on the P feedback signal phase and the P reference phase in combination with the P error feedback coefficient, the P bias voltage and the P feedback signal amplitude, and the corresponding new bias voltages are input again to the I modulation module, the Q modulation module and the P phase shifting module. In this way, according to the present disclosure, in the operating process of the optical modulator, the bias voltage is constantly corrected, such that the operating performance of the optical modulator is more stable.

BRIEF DESCRIPTION OF THE DRAWINGS

FIG. 5 is a flowchart of calculating a bias voltage and a dither amplitude of an I modulation module and a Q modulation module, and a bias voltage of a P phase shifting module in the method for automatically controlling a bias voltage of an optical modulator according to an embodiment of the present disclosure;

DETAILED DESCRIPTION

The present disclosure is further described with reference to the accompanying drawings and embodiments.

Figure 1:
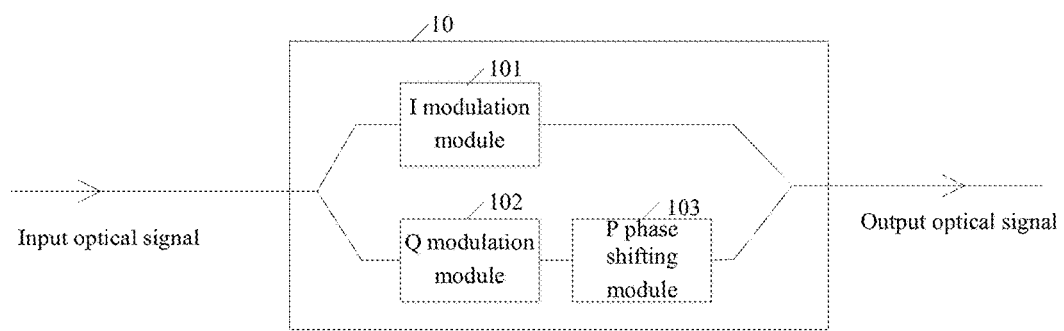
FIG. 1 is a schematic structural diagram of an optical modulator.

For better understanding of the present disclosure, before the method for automatically controlling a bias voltage of an optical modulator according to the present disclosure is described, firstly the structure of an IQ optical modulator is described. Referring to FIG. 1, FIG. 1 is a schematic structural diagram of an optical modulator. The optical modulator 10 includes an I modulation module 101, a Q modulation module 102 and a P phase shifting module 103. The I modulation module 101 is configured to modulate a modulated signal input to the I modulation module 101 to an input optical signal. The Q modulation module 102 is configured to modulate a modulated signal input to the Q modulation module 102 to an input optical signal. The P phase shifting module 103 is configured to introduce a fixed optical phase shift to the optical signal modulated by the Q modulation module 102. The optical modulator 10 may split an input optical signal into two signals, the I modulation module 101 and the Q modulation module 102 respectively receive the two signals, the P phase shifting module 103 and the Q modulation module 102 are connected in series, the optical signal modulated by the Q modulation module 102 is input to the P phase shifting module 103 for modulation, and the optical signals output by the P phase shifting module 103 and the I modulation module 101 are combined into an output optical signal. Generally, the output optical signal may be sent to a light splitter, and the light splitter splits the output optical signal into two or more signals. One of the signals is transmitted to an apparatus for automatically controlling a bias voltage of an optical modulator, and the apparatus controls the optical modulator based on the output optical signal transmitted by the light splitter.

It should be noted that: in the course of automatically controlling a bias voltage of an optical modulator, optical signals and radio frequency signals may be constantly input to the I modulation module 101 and the Q modulation module 102, the IQ optical modulator constantly transmits output optical signals, acquires the output optical signals, analyzes the optical signals and adjusts the bias voltages of the I modulation module 101, the Q modulation module 102 and the P phase shifting module 103, such that the I modulation module 101, the Q modulation module 102 and the P phase shifting module 103 stably operate at their corresponding operating points. In addition, the numbers of I modulation modules, Q modulation modules and P phase shifting modules in the optical modulator 10 are not limited to one, and instead, a plurality of I modulation modules, Q modulation modules and P phase shifting modules may be arranged. An optical modulator having a plurality of I modulation modules, Q modulation modules and P phase shifting modules may also be controlled by using the method according to the present disclosure.

Further, as seen from the structure of the optical modulator as illustrated in FIG. 1, input and output optical powers of the optical modulator are in the following relationship:

$$\frac{P_{out}}{P_{in}} = \frac{1}{8}\left(2 + \cos\left(\frac{\pi V_i}{V_{\pi i}}\right) + \cos\left(\frac{\pi V_q}{V_{\pi q}}\right) + 4\cos\left(\frac{\pi V_i}{2V_{\pi i}}\right)\cos\left(\frac{\pi V_q}{2V_{\pi q}}\right)\cos\left(\frac{\pi V_P}{V_{\pi p}}\right)\right) \quad \text{formula 1}$$

$V_I$, $V_Q$ and $V_P$ respectively denote voltages applied to the I modulation module, the Q modulation module and the P phase shifting module, and $V_{\pi i}$, $V_{\pi q}$ and $V_{\pi p}$ respectively denote half-wave voltages of the I modulation module, the Q modulation module and the P phase shifting module. A similar relationship between a direct current component and an optical power after the dither signal is applied may be concluded from formula 1. That is, the output power and the direct current component are in the following relationship:

$$\frac{P_{out}}{P_{in_{DC}}} = \frac{1}{8}\left(2 + RF_i\cos\left(\frac{\pi V_I}{V_{\pi i}}\right) + RF_q\cos\left(\frac{\pi V_Q}{V_{\pi q}}\right) + 4RF_{i/2}RF_{q/2}\cos\left(\frac{\pi V_I}{2V_{\pi i}}\right)\cos\left(\frac{\pi V_Q}{2V_{\pi q}}\right)\cos\left(\frac{\pi V_P}{V_{\pi p}}\right)\right) \quad \text{formula 2}$$

$V_I$, $V_Q$ and $V_P$ respectively denote bias voltages applied to the I modulation module, the Q modulation module and the P phase shifting module, $V_{\pi i}$, $V_{\pi q}$ and $V_{\pi p}$ respectively denote half-wave voltages applied to the I modulation module, the Q modulation module and the P phase shifting module, $RF_i$ and $RF_{i/2}$ respectively denote system parameters determined based on an I radio frequency signal of the I modulation module and a half-wave voltage of the I modulation module, and $RF_q$ and $RF_{q/2}$ respectively denote system parameters determined based on a Q radio frequency signal of the Q modulation module and a half-wave voltage of the Q modulation module.

First harmonic components acquired with respect to dither signals of the I modulation module, the Q modulation module and the P phase shifting module are respectively:

$$\frac{P_{out}}{P_{in_{i1}}} = -\frac{1}{8}\left(RF_i\sin\left(\frac{\pi V_I}{V_{\pi i}}\right) + 2RF_{i/2}RF_{q/2}\sin\left(\frac{\pi V_I}{2V_{\pi i}}\right)\cos\left(\frac{\pi V_Q}{2V_{\pi q}}\right)\cos\left(\frac{\pi V_P}{V_{\pi p}}\right)\right)A_{i1}$$

$$\frac{P_{out}}{P_{in_{q1}}} = -\frac{1}{8}\left(RF_q\sin\left(\frac{\pi V_Q}{V_{\pi i}}\right) + 2RF_{i/2}RF_{q/2}\cos\left(\frac{\pi V_I}{2V_{\pi i}}\right)\sin\left(\frac{\pi V_Q}{2V_{\pi q}}\right)\cos\left(\frac{\pi V_P}{V_{\pi p}}\right)\right)A_{q1}$$

$$\frac{P_{out}}{P_{in_{p1}}} = -\frac{1}{2}RF_{i/2}RF_{q/2}A_{p1}\cos\left(\frac{\pi V_I}{2V_{\pi i}}\right)\cos\left(\frac{\pi V_Q}{2V_{\pi q}}\right)\sin\left(\frac{\pi V_P}{V_{\pi p}}\right)$$

$V_I$, $V_Q$ and $V_P$ respectively denote bias voltages applied to the I modulation module, the Q modulation module and the P phase shifting module, $V_{\pi i}$, $V_{\pi q}$ and $V_{\pi p}$ respectively denote half-wave voltages applied to the I modulation module, the Q modulation module and the P phase shifting module, $RF_i$ and $RF_{i/2}$ respectively denote system parameters determined based on an I radio frequency signal of the I modulation module and a half-wave voltage of the I modulation module, and $RF_q$ and $RF_{q/2}$ respectively denote system parameters determined based on a Q radio frequency signal of the Q modulation module and a half-wave voltage of the Q modulation module. $A_{i1}$ denotes a system parameter determined based on an I dither signal and an I half-wave voltage, $A_{q1}$, denotes a system parameter determined based on a Q dither signal and a Q half-wave voltage, and $A_{p1}$, denotes a system parameter determined based on a P dither signal and a P half-wave voltage.

Products of a second harmonic of the P dither signal with respect to the P phase shifting module and first harmonics of the I and Q dither signals are as follows:

$$\frac{P_{out}}{P_{in_{p2}}} = \frac{1}{2}RF_{i/2}RF_{q/2}A_{p2}\cos\left(\frac{\pi V_I}{2V_{\pi i}}\right)\cos\left(\frac{\pi V_Q}{2V_{\pi q}}\right)\cos\left(\frac{\pi V_P}{V_{\pi p}}\right) \quad \text{formula 4}$$

-continued $$\frac{P_{out}}{P_{in_{pixq}}} = \frac{1}{8} RF_{i/2} RF_{q/2} A_{i1} A_{q1} \sin\left(\frac{\pi V_I}{2V_{\pi i}}\right) \sin\left(\frac{\pi V_Q}{2V_{\pi q}}\right) \cos\left(\frac{\pi V_P}{V_{\pi p}}\right)$$

$V_I$, $V_Q$ and $V_P$ respectively denote bias voltages applied to the I modulation module, the Q modulation module and the P phase shifting module, $V_{\pi i}$, $V_{\pi q}$ and $V_{\pi p}$ respectively denote half-wave voltages applied to the I modulation module, the Q modulation module and the P phase shifting module, $RF_i$ and $RF_{i/2}$ respectively denote system parameters determined based on an I radio frequency signal of the I modulation module and a half-wave voltage of the I modulation module, and $RF_q$ and $RF_{q/2}$ respectively denote system parameters determined based on a Q radio frequency signal of the Q modulation module and a half-wave voltage of the Q modulation module. $A_{i1}$ denotes a system parameter determined based on an I dither signal and an I half-wave voltage, $A_{q1}$, denotes a system parameter determined based on a Q dither signal and a Q half-wave voltage, and $A_{p1}$ denotes a system parameter determined based on a P dither signal and a P half-wave voltage. $A_{p2}$ denotes a system parameter determined based on a P dither signal and a P half-wave voltage, $A_{i1}$ denotes a system parameter determined based on an I dither signal and an I half-wave voltage, and $A_{q1}$, denotes a system parameter determined based on a Q dither signal and a Q half-wave voltage.

Figure 2:
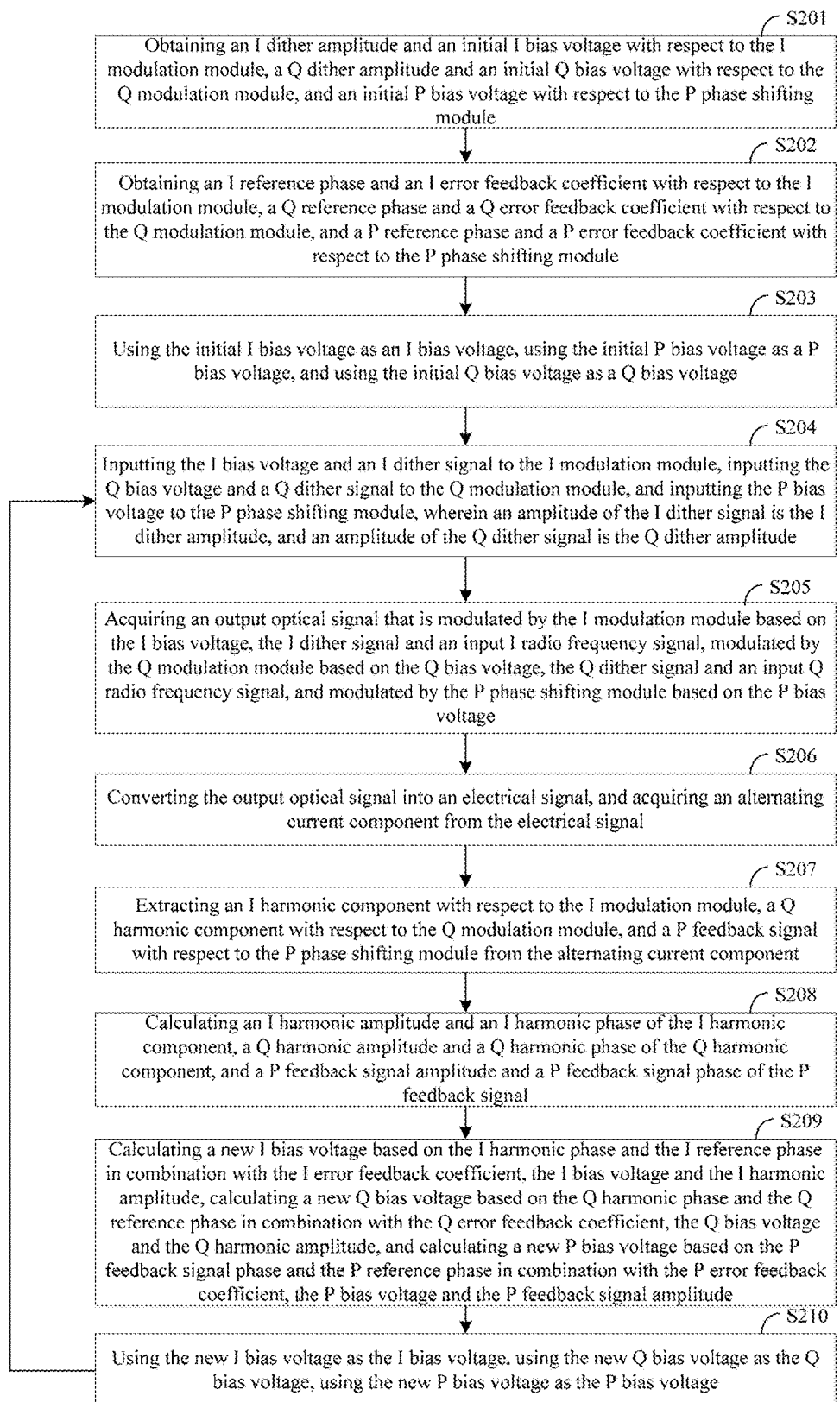
FIG. 2 is a flowchart of a method for automatically controlling a bias voltage of an optical modulator according to an embodiment of the present disclosure.

In conclusion, as seen from formula 3 and formula 4, the operating state of the optical modulator is obtained based on some feedback signal harmonic components included in the output optical signals, such that the operating state of the optical modulator is controlled. Hereinafter, a specific process of the method for automatically controlling a bias voltage of an optical modulator according to the present disclosure is described in detail. Referring to FIG. 2, FIG. 2 is a flowchart of a method for automatically controlling a bias voltage of an optical modulator according to an embodiment of the present disclosure. The method includes the following steps:

Step S201: An I dither amplitude and an initial I bias voltage with respect to the I modulation module, a Q dither amplitude and an initial Q bias voltage with respect to the Q modulation module, and an initial P bias voltage with respect to the P phase shifting module are obtained.

Step S202: An I reference phase and an I error feedback coefficient with respect to the I modulation module, a Q reference phase and a Q error feedback coefficient with respect to the Q modulation module, and a P reference phase and a P error feedback coefficient with respect to the P phase shifting module are obtained.

Step S203: The initial I bias voltage is used as an I bias voltage, the initial P bias voltage is used as a P bias voltage, and the initial Q bias voltage is used as a Q bias voltage.

Step S204: The I bias voltage and an I dither signal are input to the I modulation module, the Q bias voltage and a Q dither signal are input to the Q modulation module, and the P bias voltage is input to the P phase shifting module, wherein an amplitude of the I dither signal is the I dither amplitude, and an amplitude of the Q dither signal is the Q dither amplitude.

After the I bias voltage and the I dither signal are input to the I modulation module, the I modulation module modulates input optical signals based on the I bias voltage, the I dither signal and an input I radio frequency signal. After the Q bias voltage and the Q dither signal are input to the Q modulation module, the Q modulation module modulates input optical signals based on the Q bias voltage, the Q dither signal and an input Q radio frequency signal. After the P bias voltage is input to the P phase shifting module, the P phase shifting module modulates optical signals based on the P bias voltage. The I radio frequency signal is input by a radio frequency module to the optical modulator, and the Q radio frequency signal is input by the radio frequency module to the optical modulator. The I modulation module modulates the input optical signals based on the I bias voltage, the I dither signal and the input I radio frequency signal; and the Q modulation module modulates the input optical signals based on the Q bias voltage, the Q dither signal and the input Q radio frequency signal.

Step S205: An output optical signal that is modulated by the I modulation module based on the I bias voltage, the I dither signal and an input I radio frequency signal, modulated by the Q modulation module based on the Q bias voltage, the Q dither signal and an input Q radio frequency signal, and modulated by the P phase shifting module based on the P bias voltage is acquired.

Frequencies of the I dither signal and the Q dither signal are pre-configured. However, amplitudes of the I dither signal and the Q dither signal are variable, wherein the amplitude of the I dither signal is the I dither amplitude, the amplitude of the Q dither signal is the Q dither amplitude.

Step S206: The output optical signal is converted into an electrical signal, and an alternating current component is acquired from the electrical signal.

Step S207: An I harmonic component with respect to the I modulation module, a Q harmonic component with respect to the Q modulation module, and a P feedback signal with respect to the P phase shifting module are extracted from the alternating current component.

Frequencies of the I harmonic component, the Q harmonic component and the P feedback signal are different from each other. Therefore, the I harmonic component, the Q harmonic component and the P feedback signal may be filtered from the alternating current component based on the frequencies thereof.

Step S208: An I harmonic amplitude and an I harmonic phase of the I harmonic component, a Q harmonic amplitude and a Q harmonic phase of the Q harmonic component, and a P feedback signal amplitude and a P feedback signal phase of the P feedback signal are calculated.

Step S209: A new I bias voltage is calculated based on the I harmonic phase and the I reference phase in combination with the I error feedback coefficient, the I bias voltage and the I harmonic amplitude, a new Q bias voltage is calculated based on the Q harmonic phase and the Q reference phase in combination with the Q error feedback coefficient, the Q bias voltage and the Q harmonic amplitude, and a new P bias voltage is calculated based on the P feedback signal phase and the P reference phase in combination with the P error feedback coefficient, the P bias voltage and the P feedback signal amplitude.

Step S210: The new I bias voltage is used as the I bias voltage, the new Q bias voltage is used as the Q bias voltage, the new P bias voltage is used as the P bias voltage, and the process returns to step S204 again.

In the embodiment of the present disclosure, after the I modulation module modulates the optical signal based on the I bias voltage, the I dither signal and the input I radio frequency signal, the Q modulation module modulates the optical signal based on the Q bias voltage, the Q dither signal and the input Q radio frequency signal, and the P phase shifting module modulates the optical signal based on the P bias voltage, the I harmonic phase and the I harmonic amplitude of the I harmonic component with respect to the I modulation module, the Q harmonic amplitude and the Q harmonic phase of the Q harmonic component with respect to the Q modulation module, and the P feedback signal amplitude and the P feedback signal phase of the P feedback signal with respect to the P phase shifting module are obtained; the new I bias voltage is calculated based on the I harmonic phase and the I reference phase in combination with the I error feedback coefficient, the I bias voltage and the I harmonic amplitude; the new Q bias voltage is calculated based on the Q harmonic phase and the Q reference phase in combination with the Q error feedback coefficient, the Q bias voltage and the Q harmonic amplitude; and the new P bias voltage is calculated based on the P feedback signal phase and the P reference phase in combination with the P error feedback coefficient, the P bias voltage and the P feedback signal amplitude, and the corresponding new bias voltages are input again to the I modulation module, the Q modulation module and the P phase shifting module. In this way, according to the present disclosure, in the operating process of the optical modulator, the bias voltage is constantly corrected, such that the operating performance of the optical modulator is more stable.

As seen from the structure of the optical modulator, after a bias voltage and a dither signal are applied to the I modulation module and the Q modulation module, the dither signals input to the I modulation module and the Q modulation module may overlap at an output of the optical modulator and thus a mixed-frequency signal is formed, and the P bias voltage may cause impacts to the mixed-frequency signal. Therefore, the P bias voltage may be directly input to the P phase shifting module, and the P phase shifting module modulates the optical signal based on the P bias voltage. Nevertheless, the P bias voltage and the P dither signal may be simultaneously input to the P phase shifting module, and the P phase shifting module modulates the optical signal based on the P bias voltage and the P dither signal. Hereinafter, two scenarios where the P bias voltage is directly input to the P phase shifting module and where the P bias voltage and the P dither signal are simultaneously input to the P phase shifting module are respectively described.

(1) The P bias voltage is input to the P phase shifting module, the I bias voltage and the I dither signal are input to the I modulation module, and the Q bias voltage and the Q dither signal are input to the Q modulation module.

The P feedback signal includes a mixed-frequency harmonic component, wherein the mixed-frequency harmonic component includes a difference-frequency harmonic component between the I dither signal and the Q dither signal and/or a sum-frequency harmonic component between the I dither signal and the Q dither signal; the P reference phase includes a mixed-frequency reference phase of the mixed-frequency harmonic component; the P feedback signal amplitude includes a mixed-frequency harmonic amplitude of the mixed-frequency harmonic component; P feedback signal phase includes a mixed-frequency harmonic phase of the mixed-frequency harmonic component; and the P error feedback coefficient includes a mixed-frequency error feedback coefficient. The step of calculating the new P bias voltage based on the P feedback signal phase and the P reference phase in combination with the P error feedback coefficient, the P bias voltage and the P feedback signal amplitude in step S209 specifically includes: calculating the new P bias voltage based on the mixed-frequency harmonic phase and the mixed-frequency reference phase in combination with the mixed-frequency error feedback coefficient, the P bias voltage and the mixed-frequency harmonic amplitude.

(2) The P bias voltage and the P dither signal are input to the P phase shifting module, the I bias voltage and the I dither signal are input to the I modulation module, and the Q bias voltage and the Q dither signal are input to the Q modulation module.

The P feedback signal includes a mixed-frequency harmonic component and a direct harmonic component, wherein the direct harmonic component is a direct harmonic component that is generated by the P dither signal. The P feedback signal amplitude further includes a direct harmonic amplitude of the direct harmonic component and a mixed-frequency harmonic amplitude of the mixed-frequency harmonic component; the P feedback signal phase further includes a direct harmonic phase of the direct harmonic component and a mixed-frequency harmonic phase of the mixed-frequency harmonic component; the P reference phase further includes a direct reference phase and a mixed-frequency reference phase; and the P error feedback coefficient further includes a direct error feedback coefficient and a mixed-frequency error feedback coefficient.

The P bias voltage may be calculated based on related data of one of the mixed-frequency harmonic component and the direct harmonic component, or may be calculated based on related data of both of the mixed-frequency harmonic component and the direct harmonic component. In this case, the method further includes: further obtaining the P dither amplitude with respect to the P phase shifting module in addition to obtaining the initial P bias voltage with respect to the P phase shifting module in step S201, further inputting the P dither signal to the P phase shifting module in addition to inputting the P bias voltage to the P phase shifting module in step S204; such that the P phase shifting module modulates the optical signal based on the P bias voltage and the P dither signal, wherein the amplitude of the P dither signal is the P dither amplitude. It should be noted that the frequency of the P dither signal is fixed whereas the amplitude of the P dither signal is variable.

Figure 3:
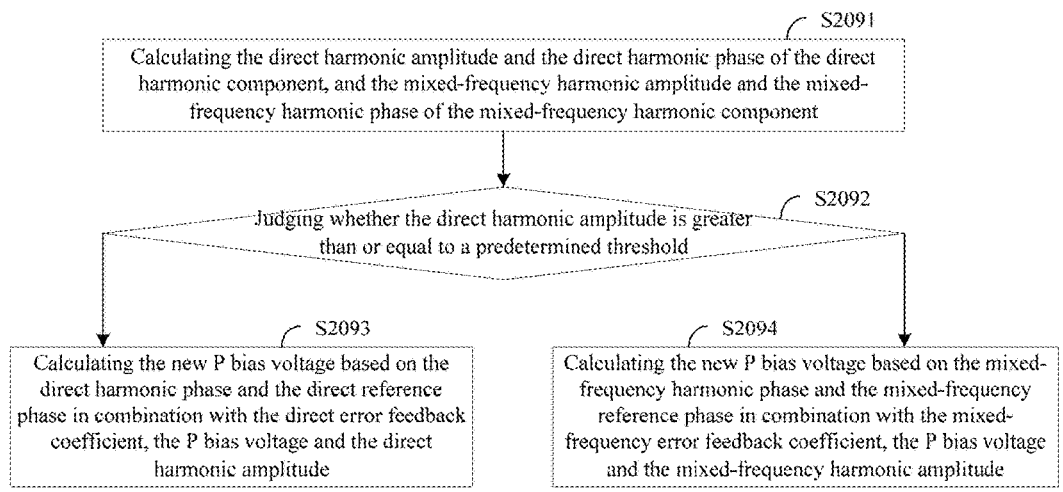
FIG. 3 is a flowchart of calculating a new P bias voltage in the method for automatically controlling a bias voltage of an optical modulator according to an embodiment of the present disclosure.

As illustrated in FIG. 3, step S209 further specifically includes:

step S2091: calculating the direct harmonic amplitude and the direct harmonic phase of the direct harmonic component, and the mixed-frequency harmonic amplitude and the mixed-frequency harmonic phase of the mixed-frequency harmonic component;

step S2092: judging whether the direct harmonic amplitude is greater than or equal to a predetermined threshold, performing step S2093 if the direct harmonic amplitude is greater than or equal to the predetermined threshold, and otherwise, performing step S2094;

step S2093: calculating the new P bias voltage based on the direct harmonic phase and the direct reference phase in combination with the direct error feedback coefficient, the P bias voltage and the direct harmonic amplitude; and step S2094: calculating the new P bias voltage based on the mixed-frequency harmonic phase and the mixed-frequency reference phase in combination with the mixed-frequency error feedback coefficient, the P bias voltage and the mixed-frequency harmonic amplitude.

Figure 4:
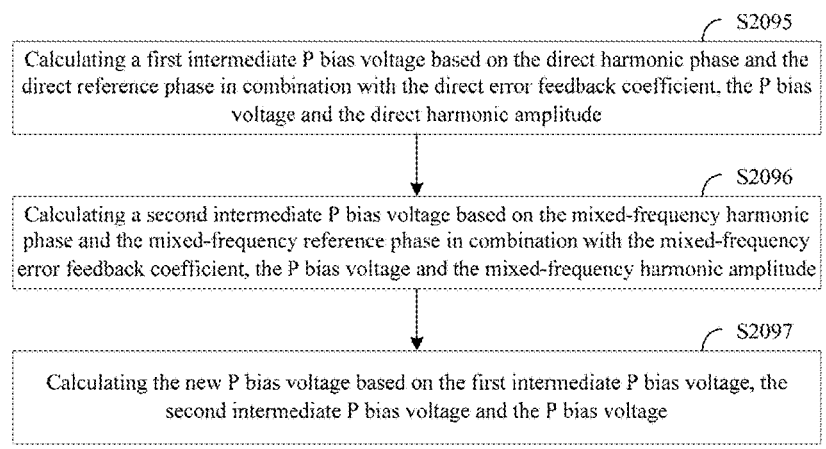
FIG. 4 is a flowchart of calculating a new P bias voltage in the method for automatically controlling a bias voltage of an optical modulator according to an embodiment of the present disclosure.

As illustrated in FIG. 4, step S209 further specifically includes:

step S2095: calculating a first intermediate P bias voltage based on the direct harmonic phase and the direct reference phase in combination with the direct error feedback coefficient, the P bias voltage and the direct harmonic amplitude;

step S2096: calculating a second intermediate P bias voltage based on the mixed-frequency harmonic phase and the mixed-frequency reference phase in combination with the mixed-frequency error feedback coefficient, the P bias voltage and the mixed-frequency harmonic amplitude; and step S2097: calculating the new P bias voltage based on the first intermediate P bias voltage, the second intermediate P bias voltage and the P bias voltage.

The new P bias voltage may be calculated based on the first intermediate P bias voltage, the second intermediate P bias voltage and the P bias voltage in many manners. For example, a first difference between the first intermediate P bias voltage and the P bias voltage is calculated, a second difference between the second intermediate P bias voltage and the P bias voltage is calculated, and a sum of the first difference, the second difference and the P bias voltage is used as the new P bias voltage.

In the embodiment of the present disclosure, as seen from formula 1 and formula 2, by means of inputting the predetermined voltage and the scanning voltage, the I dither amplitude and the initial I bias voltage with respect to the I modulation module are obtained, the Q dither amplitude and the initial Q bias voltage with respect to the Q modulation module are obtained, and the initial P bias voltage with respect to the P phase shifting module is obtained. As illustrated in FIG. 5, step S201 includes:

step S2011: respectively inputting a first predetermined voltage and a second predetermined voltage to the Q modulation module and the P phase shifting module, sequentially inputting a plurality of first scanning voltages to the I modulation module, acquiring output optical signals corresponding to the plurality of first scanning voltages, converting the output optical signals corresponding to the plurality of first scanning voltages into electrical signals corresponding to the plurality of first scanning voltages, extracting a plurality of first direct current components corresponding to the plurality of first scanning voltages from the electrical signals corresponding to the plurality of first scanning voltages, obtaining a first direct current component having a maximum value from the plurality of first direct current components as a first maximum direct current component, and obtaining a first direct current component having a minimum value from the plurality of first direct current components as a first minimum direct current component; and inputting a third predetermined voltage to the I modulation module, inputting the second predetermined voltage to the P phase shifting module, sequentially inputting a plurality of second scanning voltages to the Q modulation module, acquiring output optical signals corresponding to the plurality of second scanning voltages, converting the output optical signals corresponding to the plurality of second scanning voltages into electrical signals corresponding to the plurality of second scanning voltages, extracting a plurality of second direct current components corresponding to the plurality of second scanning voltages from the electrical signals corresponding to the plurality of second scanning voltages, obtaining a second direct current component having a maximum value from the plurality of second direct current components as a second maximum direct current component, and obtaining a second direct current component having a minimum value from the plurality of second direct current components as a second minimum direct current component;

step S2012: inputting a first scanning voltage corresponding to the first maximum direct current component or a first scanning voltage corresponding to the first minimum direct current component to the I modulation module, inputting a second scanning voltage corresponding to the second maximum direct current component or a second scanning voltage corresponding to the second minimum direct current component to the Q modulation module, and inputting a plurality of third scanning voltages to the P phase shifting module;

step S2013: acquiring output optical signals corresponding to the plurality of third scanning voltages, converting the output optical signals corresponding to the plurality of third scanning voltages into electrical signals corresponding to the plurality of third scanning voltages, and extracting a plurality of third direct current components corresponding to the plurality of third scanning voltages from the electrical signals corresponding to the plurality of third scanning voltages;

step S2014: calculating the P dither amplitude and the initial P bias voltage with respect to the P phase shifting module based on the plurality of third direct current components; and step S2015: inputting the first predetermined voltage to the Q modulation module, inputting a positive bisection bias voltage or a negative bisection bias voltage to the P phase shifting module, inputting a plurality of fourth scanning voltages to the I modulation module, acquiring output optical signals corresponding to the plurality of fourth scanning voltages, converting the output optical signals corresponding to the plurality of fourth scanning voltages into electrical signals corresponding to the plurality of fourth scanning voltages, extracting a plurality of fourth direct current components corresponding to the plurality of fourth scanning voltages from the electrical signals corresponding to the plurality of fourth scanning voltages, and calculating the I dither amplitude and the initial I bias voltage with respect to the I modulation module based on the plurality of fourth direct current components; and inputting the third predetermined voltage to the I modulation module, inputting a positive bisection bias voltage or a negative bisection bias voltage to the P phase shifting module, inputting a plurality of fifth scanning voltages to the Q modulation module, acquiring output optical signals corresponding to the plurality of fifth scanning voltages, converting the output optical signals corresponding to the plurality of fifth scanning voltages into electrical signals corresponding to the plurality of fifth scanning voltages, extracting a plurality of fifth direct current components corresponding to the plurality of fifth scanning voltages from the electrical signals corresponding to the plurality of fifth scanning voltages, and calculating the Q dither amplitude and the initial Q bias voltage with respect to the Q modulation module based on the plurality of fifth direct current components.

Further, the initial I bias voltage includes an I valley-peak bias voltage, an I valley-bottom bias voltage, a positive I bisection bias voltage and a negative I bisection bias voltage. The using the initial I bias voltage as the I bias voltage in step S230 specifically includes: using one of the I valley-peak bias voltage, the I valley-bottom bias voltage, the positive I bisection bias voltage and the negative I bisection bias voltage as the I bias voltage.

The initial Q bias voltage includes a Q valley-peak bias voltage, a Q valley-bottom bias voltage, a positive Q bisection bias voltage, and a negative Q bisection bias voltage. The step of using the initial Q bias voltage as a Q bias voltage in step S203 specifically includes: using one of the Q valley-peak bias voltage, the Q valley-bottom bias voltage, the positive Q bisection bias voltage and the negative Q bisection bias voltage as the Q bias voltage.

The initial P bias voltage includes a P valley-peak bias voltage, a P valley-bottom bias voltage, a positive P bisection bias voltage, and a negative P bisection bias voltage. The step of using the initial P bias voltage as a P bias voltage in step S203 specifically includes: using one of the P valley-peak bias voltage, the P valley-bottom bias voltage, the positive P bisection bias voltage and the negative P bisection bias voltage as the P bias voltage.

The I reference phase includes a positive I reference phase and a negative I reference phase, the Q reference phase includes a positive Q reference phase and a negative Q reference phase, the direct reference phase includes a positive direct reference phase and a negative direct reference phase, and the mixed-frequency reference phase includes a positive mixed-frequency reference phase and a negative mixed-frequency reference phase.

The method further includes:

calculating a P half-wave voltage with respect to the P phase shifting module while calculating the P dither amplitude and the initial P bias voltage with respect to the P phase shifting module based on the plurality of third direct current components; calculating an I half-wave voltage with respect to the I modulation module while calculating the I dither amplitude and the initial I bias voltage with respect to the I modulation module based on the plurality of fourth direct current components; and calculating a Q half-wave voltage with respect to the Q modulation module while calculating the Q dither amplitude and the initial Q bias voltage with respect to the Q modulation module based on the plurality of fifth direct current components.

Step S202 specifically includes:

inputting the Q valley-bottom bias voltage to the Q modulation module, inputting the positive P bisection bias voltage or the negative P bisection bias voltage to the P phase shifting module, inputting a dither signal to the I modulation module, sequentially inputting a first reference voltage and a second reference voltage to the I modulation module, respectively obtaining a positive I reference harmonic component corresponding to the first reference voltage with respect to the I modulation module and a negative I reference harmonic component corresponding to the second reference voltage with respect to the I modulation module, using a phase of the positive I reference harmonic component as the positive I reference phase, using a phase of the negative I reference harmonic component as the negative I reference phase, and calculating the I error feedback coefficient based on an amplitude of the positive I reference harmonic component, an amplitude of the negative I reference harmonic component and the I half-wave voltage. Inputting the I valley-bottom bias voltage to the I modulation module, inputting the positive P bisection bias voltage or the negative P bisection bias voltage to the P phase shifting module, inputting a dither signal to the Q modulation module, sequentially inputting a third reference voltage and a fourth reference voltage to the Q modulation module, respectively obtaining a positive Q reference harmonic component corresponding to the third reference voltage with respect to the Q modulation module and a negative Q reference harmonic component corresponding to the fourth reference voltage with respect to the Q modulation module, using a phase of the positive Q reference harmonic component as a positive Q reference phase, using a phase of the negative Q reference harmonic component as a negative Q reference phase, calculating a Q error feedback coefficient based on an amplitude of the positive Q reference harmonic component, an amplitude of the negative Q reference harmonic component and the Q half-wave voltage.

respectively inputting the I valley-bottom bias voltage and the Q valley-bottom bias voltage to the I modulation module and the Q modulation module, inputting a dither signal to the P phase shifting module, sequentially inputting a fifth reference voltage and a sixth reference voltage to the P phase shifting module, respectively obtaining a positive direct reference harmonic component corresponding to the fifth reference voltage with respect to the P phase shifting module and a negative direct reference harmonic component corresponding to the sixth reference voltage with respect to the P phase shifting module, using a phase of the negative direct reference harmonic component as a negative direct reference phase, using a phase of the positive direct reference harmonic component as a positive direct reference phase, and calculating a direct error feedback coefficient based on an amplitude of the negative direct reference harmonic component, an amplitude of the positive direct reference harmonic component and the P half-wave voltage;

inputting the I valley-bottom bias voltage and the I dither signal to the I modulation module, inputting the Q valley-bottom bias voltage and the Q dither signal to the Q modulation module, sequentially inputting a seventh reference voltage and an eighth reference voltage to the P phase shifting module, respectively obtaining a positive mixed-frequency reference harmonic component corresponding to the seventh reference voltage with respect to the P phase shifting module and a negative mixed-frequency reference harmonic component corresponding to the eighth reference voltage with respect to the P phase shifting module, using a phase of the negative mixed-frequency reference harmonic component as the negative mixed-frequency reference phase, using a phase of the positive mixed-frequency reference harmonic component as the positive mixed-frequency reference phase, and calculating the mixed-frequency error feedback coefficient based on an amplitude of the negative mixed-frequency reference harmonic component, an amplitude of the positive mixed-frequency reference harmonic component and the P half-wave voltage.

The first reference voltage and the second reference voltage are obtained via calculation based on the initial I bias voltage. Preferably, the first reference voltage and the second reference voltage are respectively a positive I bisection bias voltage and a negative I bisection bias voltage, or voltages in the vicinity of the positive I bisection bias voltage and the negative I bisection bias voltage.

The third reference voltage and the fourth reference voltage are obtained via calculation based on the initial Q bias voltage. Preferably, the third reference voltage and the fourth reference voltage are respectively a positive Q bisection bias voltage and a negative Q bisection bias voltage, or voltages in the vicinity of the positive Q bisection bias voltage and the negative Q bisection bias voltage.

The fifth reference voltage and the sixth reference voltage are obtained via calculation based on the initial P bias voltage. Preferably, the fifth reference voltage and the sixth reference voltage are respectively a P valley-peak bias voltage and a P valley-bottom bias voltage, or voltages in the vicinity of the P valley-peak bias voltage and the P valley-bottom bias voltage.

The seventh reference voltage and the eighth reference voltage are obtained via calculation based on the initial P bias voltage. Preferably, the seventh reference voltage and the eighth reference voltage are respectively a P valley-peak bias voltage and a P valley-bottom bias voltage, or voltages in the vicinity of the P valley-peak bias voltage and the P valley-bottom bias voltage.

Further, the Q error feedback coefficient is calculated based on the amplitude of the positive Q reference harmonic component, the amplitude of the negative Q reference harmonic component and the Q half-wave voltage using a first calculation formula:

$$f_Q = c_Q * \frac{V_Q}{A_Q * \pi}$$

wherein $f_Q$ denotes the Q error feedback coefficient, $V_Q$ denotes the Q half-wave voltage, $A_Q$ denotes the amplitude of the positive Q reference harmonic component or the negative Q reference harmonic component, and $c_Q$ denotes a constant.

The I error feedback coefficient is calculated based on the amplitude of the positive I reference harmonic component, the amplitude of the negative I reference harmonic component and the I half-wave voltage using a second calculation formula:

$$f_I = c_I * \frac{V_I}{A_I * \pi}$$

wherein $f_I$ denotes the I error feedback coefficient, $V_I$ denotes the I half-wave voltage, $A_I$ denotes the amplitude of the positive I reference harmonic component or the negative I reference harmonic component, and $c_I$ denotes a constant.

The direct error feedback coefficient is calculated based on the amplitude of the positive direct reference harmonic component, the amplitude of the negative direct reference harmonic component and the P half-wave voltage using a third calculation formula:

$$f_{p'} = c' * \frac{V_p}{A_{p'} * \pi}$$

wherein $f_{p'}$ denotes the direct error feedback coefficient, $V_p$ denotes the P half-wave voltage, $A_{p'}$ denotes the amplitude of the positive direct reference harmonic component or the negative direct reference harmonic component, and $c'$ denotes a constant.

The mixed-frequency error feedback coefficient is calculated based on the amplitude of the positive mixed-frequency reference harmonic component, the amplitude of the negative mixed-frequency reference harmonic component and the P half-wave voltage using a fourth calculation formula:

$$f_{p''} = c'' * \frac{V_p}{A_{p''} * \pi}$$

wherein $f_{p''}$ denotes the direct error feedback coefficient, $V_p$ denotes the P half-wave voltage, $A_{p''}$ denotes the amplitude of the positive direct reference harmonic component or the negative direct reference harmonic component, and $c''$ denotes a constant.

It should be noted that a part or all of the data of the Q dither amplitude, the Q reference phase, the Q error feedback coefficient, the I dither amplitude, the I reference phase, the I error feedback coefficient, the P dither amplitude, the direct reference phase, the direct error feedback coefficient, the mixed-frequency reference phase and the mixed-frequency error feedback coefficient may be pre-calculated based on the above calculation process, and stored in a memory unit in the system, and the data may be directly extracted from the memory unit where necessary.

Figure 6:
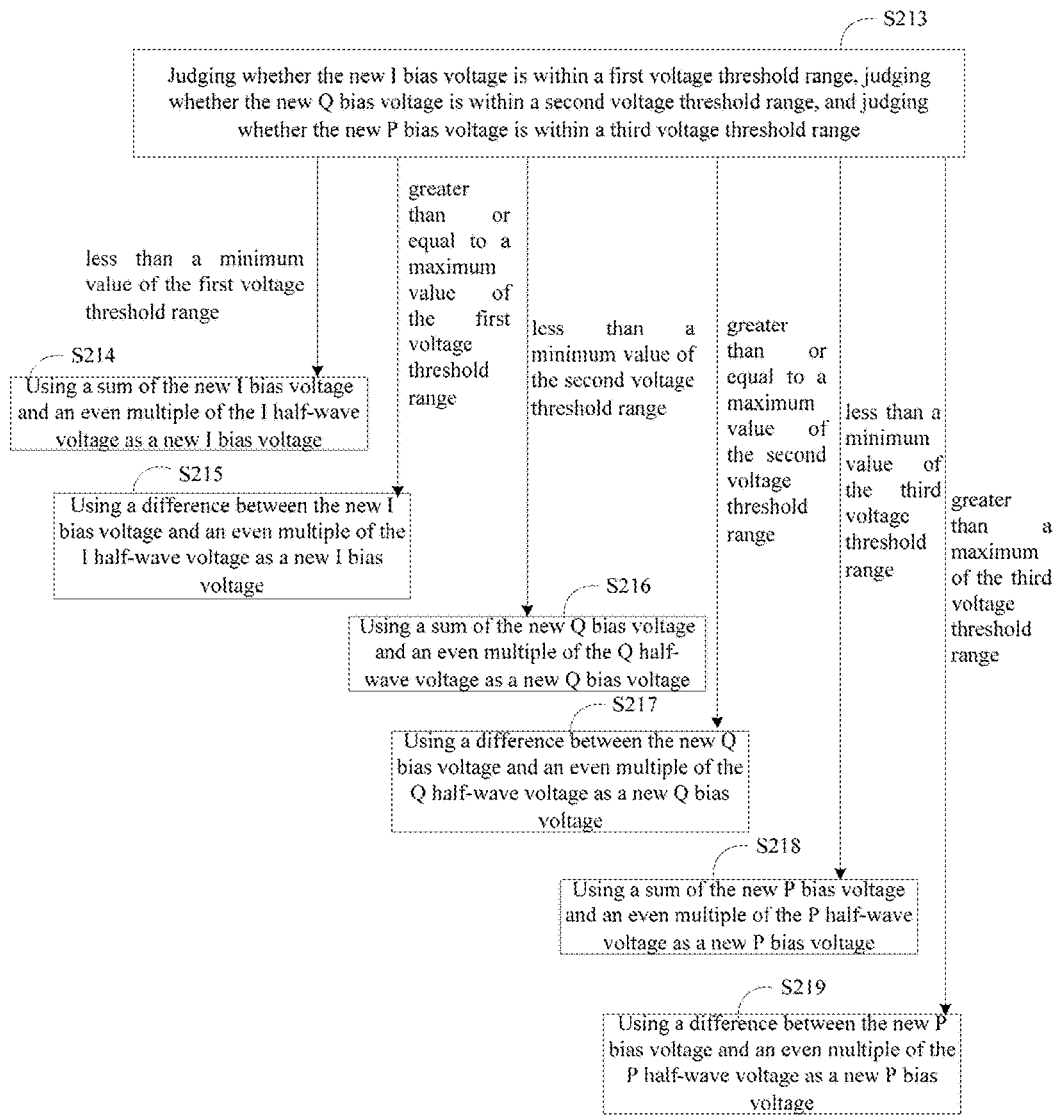
FIG. 6 is a flowchart of adjusting a new I bias voltage, a new Q bias voltage and a new P bias voltage in the method for automatically controlling a bias voltage of an optical modulator according to an embodiment of the present disclosure.

To prevent an over-high or over-low new bias voltage which affects modulation performance of the optical modulator, the calculated new bias voltage may also be detected. When the new bias voltage is over-high or over-low, the voltage is back adjusted proactively. As illustrated in FIG. 6, between step S209 and step S210, the method further includes the following steps:

Step S213: Whether the new I bias voltage is within a first voltage threshold range is judged, whether the new Q bias voltage is within a second voltage threshold range is judged, and whether the new P bias voltage is within a third voltage threshold range is judged; if the new I bias voltage is less than a minimum value of the first voltage threshold range, the process goes to step S214, and if the new I bias voltage is greater than or equal to a maximum value of the first voltage threshold range, the process goes to step S215; if the new Q bias voltage is less than a minimum value of the second voltage threshold range, the process goes to step S216, and if the new Q bias voltage is greater than or equal to a maximum value of the second voltage threshold range, the process goes to step S217; and if the new P bias voltage is less than a minimum value of the third voltage threshold range, the process goes to step S218, and if the new P bias voltage is greater than or equal to a maximum value of the third voltage threshold range, the process goes to step S219.

Step S214: A sum of the new I bias voltage and an even multiple of the I half-wave voltage is used as a new I bias voltage, and the process goes to step S210.

Step S215: A difference between the new I bias voltage and an even multiple of the I half-wave voltage is used as a new I bias voltage, and the process returns to step S210.

Step S216: A sum of the new Q bias voltage and an even multiple of the Q half-wave voltage is used as a new Q bias voltage, and the process returns to step S210.

Step S217: A difference between the new Q bias voltage and an even multiple of the Q half-wave voltage is used as a new Q bias voltage, and the process returns to step S210.

Step S218: A sum of the new P bias voltage and an even multiple of the P half-wave voltage is used as a new P bias voltage, and the process returns to step S210.

Step S219: A difference between the new P bias voltage and an even multiple of the P half-wave voltage is used as a new P bias voltage, and the process returns to step S210.

Nevertheless, prior to step S202, a test voltage may be input to the I modulation module, the Q modulation module and the P phase shifting module, output optical signals are acquired as test optical signals, the test optical signals are converted into test electrical signals, corresponding direct current signals are extracted from the test electrical signals, a proportion coefficient between a maximum value of the direct current signals and a predetermined direct current threshold, an amplification coefficient of an amplifier is calculated based on the proportion coefficient and the amplification coefficient is input to the amplifier, and the amplifier amplifies the acquired electrical signals to ensure that the performance of the electrical signals entering the filter is consistent.

In the embodiment of the present disclosure, after the I modulation module modulates the optical signal based on the I bias voltage, the I dither signal and the input I radio frequency signal, the Q modulation module modulates the optical signal based on the Q bias voltage, the Q dither signal and the input Q radio frequency signal, and the P phase shifting module modulates the optical signal based on the P bias voltage, the I harmonic phase and the I harmonic amplitude of the I harmonic component with respect to the I modulation module, the Q harmonic amplitude and the Q harmonic phase of the Q harmonic component with respect to the Q modulation module, and the P feedback signal amplitude and the P feedback signal phase of the P phase shifting module are obtained; the new I bias voltage is calculated based on the I harmonic phase and the I reference phase in combination with the I error feedback coefficient, the I bias voltage and the I harmonic amplitude; the new Q bias voltage is calculated based on the Q harmonic phase and the Q reference phase in combination with the Q error feedback coefficient, the Q bias voltage and the Q harmonic amplitude; and the new P bias voltage is calculated based on the P feedback signal phase and the P reference phase in combination with the P error feedback coefficient, the P bias voltage and the P feedback signal amplitude, and the corresponding new bias voltages are input again to the I modulation module, the Q modulation module and the P phase shifting module. In this way, according to the present disclosure, in the operating process of the optical modulator, the bias voltage is constantly corrected, such that the operating performance of the optical modulator is more stable.

Figure 7:
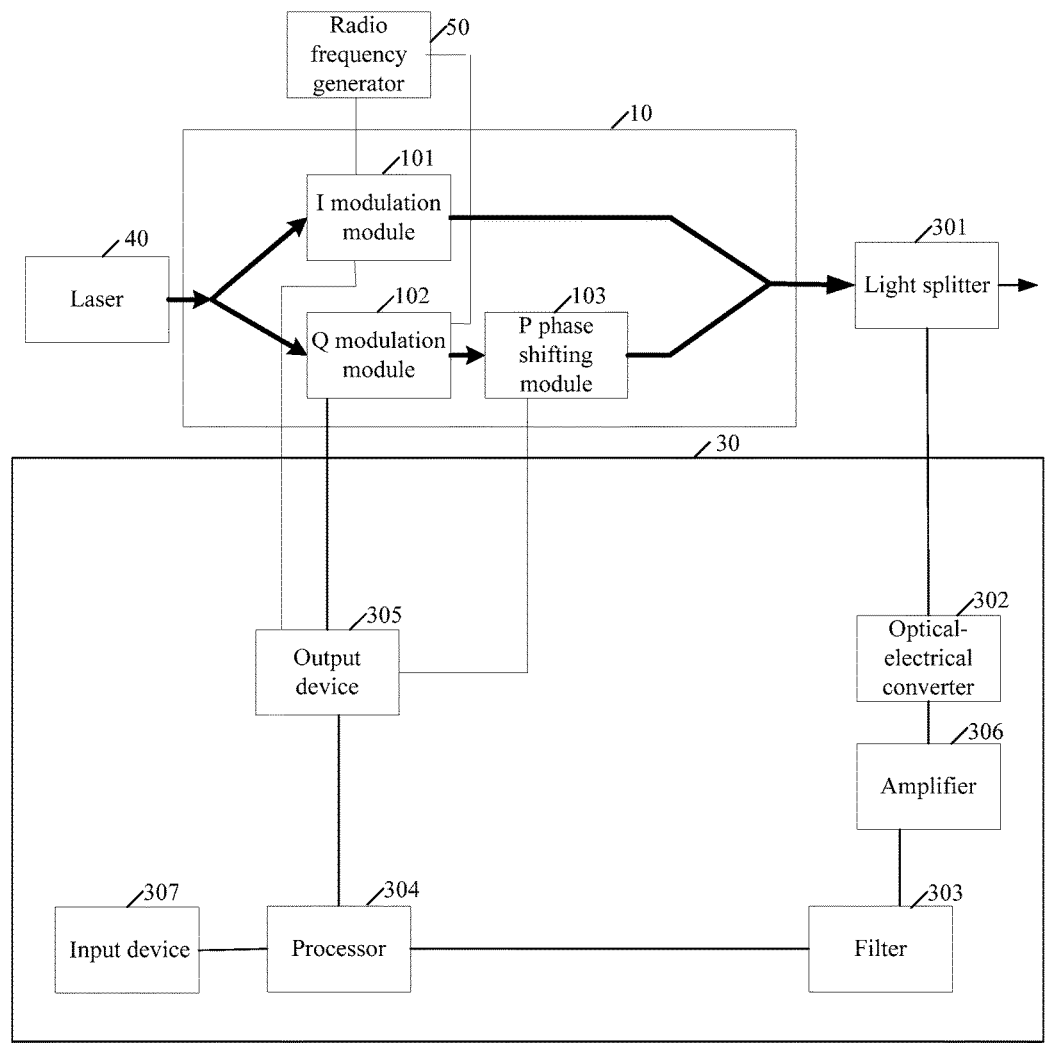
FIG. 7 is a schematic structural diagram of an apparatus for automatically controlling a bias voltage of an optical modulator according to an embodiment of the present disclosure.

An embodiment of the present disclosure further provides an apparatus 30 for automatically controlling a bias voltage of an optical modulator. Referring to FIG. 7, the apparatus 30 includes: an optical-electrical converter 302, a filter 303, a processor 304, and an output device 305. The structure of the optical modulator 10 is described above. A laser 40 inputs optical signals to the I modulation module 101 and Q modulation module 102.

The processor 304 is configured to: obtain an I dither amplitude and an initial I bias voltage with respect to the I modulation module 101, a Q dither amplitude and an initial Q bias voltage with respect to the Q modulation module 102, and an initial P bias voltage with respect to the P phase shifting module 103; obtain an I reference phase and an I error feedback coefficient with respect to the I modulation module 101, a Q reference phase and a Q error feedback coefficient with respect to the Q modulation module 102, and a P reference phase and a P error feedback coefficient with respect to the P phase shifting module 103; use the initial I bias voltage as an I bias voltage, use the initial P bias voltage as a P bias voltage, and use the initial Q bias voltage as a Q bias voltage; and send the Q bias voltage, the I bias voltage and the P bias voltage to the output device 305.

The output device 305 is configured to input the I bias voltage and an I dither signal to the I modulation module 101, input the Q bias voltage and a Q dither signal to the Q modulation module 102, and input the P bias voltage to the P phase shifting module 103, wherein an amplitude of the I dither signal is the I dither amplitude, and an amplitude of the Q dither signal is the Q dither amplitude.

The optical-electrical converter 302 is configured to: acquire, via a light splitter, an output optical signal that is modulated by the I modulation module 101 based on the I bias voltage, the I dither signal and an input I radio frequency signal which is being sent form a radio frequency generator 50, modulated by the Q modulation module 102 based on the Q bias voltage, the Q dither signal and an input Q radio frequency signal which is being sent form the radio frequency generator 50, and modulated by the P phase shifting module 103 based on the P bias voltage, and convert the output optical signal into an electrical signal.

The filter 303 is configured to extract an alternating current component from the electrical signal.

The processor 304 is configured to extract an I harmonic component with respect to the I modulation module 101, a Q harmonic component with respect to the Q modulation module 102, and a P feedback signal with respect to the P phase shifting module 103 from the alternating current component.

The processor 304 is configured to: calculate an I harmonic amplitude and an I harmonic phase of the I harmonic component, a Q harmonic amplitude and a Q harmonic phase of the Q harmonic component, and a P feedback signal amplitude and a P feedback signal phase of the P feedback signal; calculate a new I bias voltage based on the I harmonic phase and the I reference phase in combination with the I error feedback coefficient, the I bias voltage and the I harmonic amplitude, calculate a new Q bias voltage based on the Q harmonic phase and the Q reference phase in combination with the Q error feedback coefficient, the Q bias voltage and the Q harmonic amplitude, and calculate a new P bias voltage based on the P feedback signal phase and the P reference phase in combination with the P error feedback coefficient, the P bias voltage and the P feedback signal amplitude; and use the new I bias voltage as the I bias voltage, use the new Q bias voltage as the Q bias voltage, use the new P bias voltage as the P bias voltage, and send the Q bias voltage, the I bias voltage and the P bias voltage to the output device 305, such that the output device 305 inputs the I bias voltage and the I dither signal to the I modulation module 101, and inputs the Q bias voltage and the Q dither signal to the Q modulation module 102, and inputs the P bias voltage to the P phase shifting module 103.

As seen from the structure of the optical modulator, after a bias voltage and a dither signal are applied to the I modulation module 101 and the Q modulation module 102, the dither signals input to the I modulation module 101 and the Q modulation module 102 may overlap at an output of the optical modulator and thus a mixed-frequency signal is formed, and the P bias voltage may cause impacts to the mixed-frequency signal. Therefore, the P bias voltage may be directly input to the P phase shifting module 103, and the P phase shifting module 103 modulates the optical signal based on the P bias voltage. Nevertheless, the P bias voltage and the P dither signal may be simultaneously input to the P phase shifting module 103, and the P phase shifting module 103 modulates the optical signal based on the P bias voltage and the P dither signal. Hereinafter, two scenarios where the P bias voltage is directly input to the P phase shifting module 103 and where the P bias voltage and the P dither signal are simultaneously input to the P phase shifting module 103 are respectively described.

(1) The output device 305 inputs only the P bias voltage to the P phase shifting module 103, inputs the I bias voltage and the I dither signal to the I modulation module 101, and inputs the Q bias voltage and the Q dither signal to the Q modulation module 102.

The P feedback signal includes a mixed-frequency harmonic component, wherein the mixed-frequency harmonic component includes a difference-frequency harmonic component between the I dither signal and the Q dither signal and/or a sum-frequency harmonic component between the I dither signal and the Q dither signal; the P reference phase includes a mixed-frequency reference phase of the mixed-frequency harmonic component; the P feedback signal amplitude includes a mixed-frequency harmonic amplitude of the mixed-frequency harmonic component; P feedback signal phase includes a mixed-frequency harmonic phase of the mixed-frequency harmonic component; and the P error feedback coefficient includes a mixed-frequency error feedback coefficient. The processor 304 is configured to calculate the new P bias voltage based on the mixed-frequency harmonic phase and the mixed-frequency reference phase in combination with the mixed-frequency error feedback coefficient, the P bias voltage and the mixed-frequency harmonic amplitude.

(2) The output device 305 inputs the P bias voltage and the P dither signal to the P phase shifting module 103, inputs the I bias voltage and the I dither signal to the I modulation module 101, and inputs the Q bias voltage and the Q dither signal to the Q modulation module 102.

The P feedback signal includes a direct harmonic component and a mixed-frequency harmonic component, wherein the direct harmonic component is a direct harmonic component that is generated by the P dither signal. The P feedback signal amplitude further includes a direct harmonic amplitude of the direct harmonic component and a mixed-frequency harmonic amplitude of the mixed-frequency harmonic component; the P feedback signal phase further includes a direct harmonic phase of the direct harmonic component and a mixed-frequency harmonic phase of the mixed-frequency harmonic component; the P reference phase further includes a direct reference phase of the direct harmonic component and a mixed-frequency reference phase of the mixed-frequency harmonic component; and the P error feedback coefficient further includes a direct error feedback coefficient and a mixed-frequency error feedback coefficient.

The processor 304 is further configured to: obtain a P dither amplitude with respect to the P phase shifting module 103 while obtaining the initial P bias voltage with respect to the P phase shifting module 103; inputting a P dither signal to the P phase shifting module 103 while inputting the P bias voltage to the P phase shifting module 103, such that the P phase shifting module 103 performs modulation based on the P bias voltage and the P dither signal, wherein an amplitude of the P dither signal is the P dither amplitude.

The processor 304 being configured to calculate a P feedback signal amplitude and a P feedback signal phase of the P feedback signal includes: the processor 304 is configured to calculate a direct harmonic amplitude and a direct harmonic phase of the direct harmonic component, and calculate a mixed-frequency harmonic amplitude and a mixed-frequency harmonic phase of the mixed-frequency harmonic component.

The processor 304 being configured to calculate a new P bias voltage based on the P feedback signal phase and the P reference phase in combination with the P error feedback coefficient, the P bias voltage and the P feedback signal amplitude includes:

the processor 304 is configured to:

judge whether the direct harmonic amplitude is greater than or equal to a predetermined threshold, calculate the new P bias voltage based on the direct harmonic phase and the direct reference phase in combination with the direct error feedback coefficient, the P bias voltage and the direct harmonic amplitude if the direct harmonic amplitude is greater than or equal to the predetermined threshold, and calculate the new P bias voltage based on the mixed-frequency harmonic phase and the mixed-frequency reference phase in combination with the mixed-frequency error feedback coefficient, the P bias voltage and the mixed-frequency harmonic amplitude if the direct harmonic amplitude is less than the predetermined threshold;

or calculate a first intermediate P bias voltage based on the direct harmonic phase and the direct reference phase in combination with the direct error feedback coefficient, the P bias voltage and the direct harmonic amplitude, calculate a second intermediate P bias voltage based on the mixed-frequency harmonic phase and the mixed-frequency reference phase in combination with the mixed-frequency error feedback coefficient, the P bias voltage and the mixed-frequency harmonic amplitude, and calculate the new P bias voltage based on the first intermediate P bias voltage, the second intermediate P bias voltage and the P bias voltage.

The processor 304 being configured to: obtain an I dither amplitude and an initial I bias voltage with respect to the I modulation module 101, a Q dither amplitude and an initial Q bias voltage with respect to the Q modulation module 102, and an initial P bias voltage with respect to the P phase shifting module 103 includes:

the processor 304 is configured to:

via the output device 305, respectively input a first predetermined voltage and a second predetermined voltage to the Q modulation module 102 and the P phase shifting module 103, sequentially input a plurality of first scanning voltages to the I modulation module 101, acquire output optical signals output by the light splitter 301 and corresponding to the plurality of first scanning voltages via the optical-electrical converter 302, convert the output optical signals corresponding to the plurality of first scanning voltages into electrical signals corresponding to the plurality of first scanning voltages via the optical-electrical converter 302, extract a plurality of first direct current components corresponding to the plurality of first scanning voltages from the electrical signals corresponding to the plurality of first scanning voltages via the filter 303, obtain a first direct current component having a maximum value from the plurality of first direct current components as a first maximum direct current component, and obtain a first direct current component having a minimum value from the plurality of first direct current components as a first minimum direct current component; and via the output device 305, input a third predetermined voltage to the I modulation module 101, input the second predetermined voltage to the P phase shifting module 103, sequentially input a plurality of second scanning voltages to the Q modulation module 102, acquire output optical signals output by the light splitter 301 and corresponding to the plurality of second scanning voltages via the optical-electrical converter 302, convert the output optical signals corresponding to the plurality of second scanning voltages into electrical signals corresponding to the plurality of second scanning voltages via the optical-electrical converter 302, extract a plurality of second direct current components corresponding to the plurality of second scanning voltages from the electrical signals corresponding to the plurality of second scanning voltages via the filter 303, obtain a second direct current component having a maximum value from the plurality of second direct current components as a second maximum direct current component, and obtain a second direct current component having a minimum value from the plurality of second direct current components as a second minimum direct current component;

via the output device 305, input a first scanning voltage corresponding to the first maximum direct current component or a first scanning voltage corresponding to the first minimum direct current component to the I modulation module 101, input a second scanning voltage corresponding to the second maximum direct current component or a second scanning voltage corresponding to the second minimum direct current component to the Q modulation module 102, and input a plurality of third scanning voltages to the P phase shifting module 103;

acquire output optical signals output by the light splitter 301 and corresponding to the plurality of third scanning voltages via the optical-electrical converter 302, convert the output optical signals corresponding to the plurality of third scanning voltages into electrical signals corresponding to the plurality of third scanning voltages via the optical-electrical converter 302, and extract a plurality of third direct current components corresponding to the plurality of third scanning voltages from the electrical signals corresponding to the plurality of third scanning voltages via the filter 303;

calculate the P dither amplitude and the initial P bias voltage with respect to the P phase shifting module 103 based on the plurality of third direct current components; and via the output device 305, input a first predetermined voltage to the Q modulation module 102, inputting a positive bisection bias voltage or a negative bisection bias voltage to the P phase shifting module 103, input a plurality of fourth scanning voltages to the I modulation module 101, acquire output optical signals output by the light splitter 301 and corresponding to the plurality of fourth scanning voltages via the optical-electrical converter 302, convert the output optical signals corresponding to the plurality of fourth scanning voltages into electrical signals corresponding to the plurality of fourth scanning voltages via the optical-electrical converter 302, extract a plurality of fourth direct current components corresponding to the plurality of fourth scanning voltages from the electrical signals corresponding to the plurality of fourth scanning voltages via the filter 303, and calculate the I dither amplitude and the initial I bias voltage with respect to the I modulation module 101 based on the plurality of fourth direct current components; and input the third predetermined voltage to the I modulation module 101, input the positive bisection bias voltage or the negative bisection bias voltage to the P phase shifting module 103, input a plurality of fifth scanning voltages to the Q modulation module 102, acquire output optical signals output by the light splitter 301 and corresponding to the plurality of fifth scanning voltages via the optical-electrical converter 302, convert the output optical signals corresponding to the plurality of fifth scanning voltages into electrical signals corresponding to the plurality of fifth scanning voltages via the optical-electrical converter 302, extract a plurality of fifth direct current components corresponding to the plurality of fifth scanning voltages from the electrical signals corresponding to the plurality of fifth scanning voltages via the filter 303, and calculate the Q dither amplitude and the initial Q bias voltage with respect to the Q modulation module 102 based on the plurality of fifth direct current components.

In the embodiment of the present disclosure, the initial I bias voltage includes an I valley-peak bias voltage, an I valley-bottom bias voltage, a positive I bisection bias voltage, and a negative I bisection bias voltage. The processor 304 is configured to use one of the I valley-peak bias voltage, the I valley-bottom bias voltage, the positive I bisection bias voltage and the negative I bisection bias voltage as the I bias voltage.

The initial Q bias voltage includes a Q valley-peak bias voltage, a Q valley-bottom bias voltage, a positive Q bisection bias voltage, and a negative Q bisection bias voltage. The processor 304 is configured to use one of the Q valley-peak bias voltage, the Q valley-bottom bias voltage, the positive Q bisection bias voltage and the negative Q bisection bias voltage as the Q bias voltage.

The initial P bias voltage includes a P valley-peak bias voltage, a P valley-bottom bias voltage, a positive P bisection bias voltage, and a negative P bisection bias voltage. The processor 304 is configured to use one of the P valley-peak bias voltage, the P valley-bottom bias voltage, the positive P bisection bias voltage and the negative P bisection bias voltage as the P bias voltage.

The I reference phase includes a positive I reference phase and a negative I reference phase, the Q reference phase includes a positive Q reference phase and a negative Q reference phase, the direct reference phase includes a positive direct reference phase and a negative direct reference phase, and the mixed-frequency reference phase includes a positive mixed-frequency reference phase and a negative mixed-frequency reference phase.

The processor 304 is further configured to: calculate a P half-wave voltage with respect to the P phase shifting module 103 while calculating the P dither amplitude and the initial P bias voltage with respect to the P phase shifting module 103 based on the plurality of third direct current components; calculate an I half-wave voltage with respect to the I modulation module 101 while calculating the I dither amplitude and the initial I bias voltage with respect to the I modulation module 101 based on the plurality of fourth direct current components; and calculate a Q half-wave voltage with respect to the Q modulation module 102 while calculating the Q dither amplitude and the initial Q bias voltage with respect to the Q modulation module 102 based on the plurality of fifth direct current components.

The processor 304 being configured to obtain an I reference phase and an I error feedback coefficient with respect to the I modulation module 101, a Q reference phase and a Q error feedback coefficient with respect to the Q modulation module 102, and a P reference phase and a P error feedback coefficient with respect to the P phase shifting module 103 includes:

the processor 304 is configured to:

via the output device 305, input a Q valley-bottom bias voltage to the Q modulation module 102, input a positive P bisection bias voltage or a negative P bisection bias voltage to the P phase shifting module 103, input a dither signal to the I modulation module 101, sequentially input a first reference voltage and a second reference voltage to the I modulation module 101, respectively obtain a positive I reference harmonic component corresponding to the first reference voltage with respect to the I modulation module 101 and a negative I reference harmonic component corresponding to the second reference voltage with respect to the I modulation module 101, use a phase of the positive I reference harmonic component as the positive I reference phase, use a phase of the negative I reference harmonic component as the negative I reference phase, and calculate the I error feedback coefficient based on an amplitude of the positive I reference harmonic component, an amplitude of the negative I reference harmonic component and the I half-wave voltage, wherein the first reference voltage and the second reference voltage are obtained via calculation based on the initial I bias voltage;

via the output device 305, input an I valley-bottom bias voltage to the I modulation module 101, input a positive P bisection bias voltage or a negative P bisection bias voltage to the P phase shifting module 103, input a dither signal to the Q modulation module 102, sequentially input a third reference voltage and a fourth reference voltage to the Q modulation module 102, respectively obtain a positive Q reference harmonic component corresponding to the third reference voltage with respect to the Q modulation module 102 and a negative Q reference harmonic component corresponding to the fourth reference voltage with respect to the Q modulation module 102, use a phase of the positive Q reference harmonic component as the positive Q reference phase, use a phase of the negative Q reference harmonic component as the negative Q reference phase, and calculate the Q error feedback coefficient based on an amplitude of the positive Q reference harmonic component, an amplitude of the negative Q reference harmonic component and the Q half-wave voltage, wherein the third reference voltage and the fourth reference voltage are obtained via calculation based on the initial Q bias voltage;

via the output device 305, respectively input an I valley-bottom bias voltage and a Q valley-bottom bias voltage to the I modulation module 101 and the Q modulation module 102, input a dither signal to the P phase shifting module 103, sequentially input a fifth reference voltage and a sixth reference voltage to the P phase shifting module 103, respectively obtain a positive direct reference harmonic component corresponding to the fifth reference voltage with respect to the P phase shifting module 103 and a negative direct reference harmonic component corresponding to the sixth reference voltage with respect to the P phase shifting module 103, use a phase of the negative direct reference harmonic component as the negative direct reference phase, use a phase of the positive direct reference harmonic component as the positive direct reference phase, and calculate the direct error feedback coefficient based on an amplitude of the negative direct reference harmonic component, an amplitude of the positive direct reference harmonic component and the P half-wave voltage, wherein the fifth reference voltage and the sixth reference voltage are obtained via calculation based on the initial P bias voltage; and via the output device 305, input an I valley-bottom bias voltage and an I dither signal to the I modulation module 101, input a Q valley-bottom bias voltage and a Q dither signal to the Q modulation module 102, sequentially input a seventh reference voltage and an eighth reference voltage to the P phase shifting module 103, respectively obtain a positive mixed-frequency reference harmonic component corresponding to the seventh reference voltage with respect to the P phase shifting module 103 and a negative mixed-frequency reference harmonic component corresponding to the eighth reference voltage with respect to the P phase shifting module 103, use a phase of the negative mixed-frequency reference harmonic component as the negative mixed-frequency reference phase, use a phase of the positive mixed-frequency reference harmonic component as the positive mixed-frequency reference phase, and calculate the mixed-frequency error feedback coefficient based on an amplitude of the negative mixed-frequency reference harmonic component, an amplitude of the positive mixed-frequency reference harmonic component and the P half-wave voltage, wherein the seventh reference voltage and the eighth reference voltage are obtained via calculation based on the initial P bias voltage.

In this embodiment, preferably, the first reference voltage and the second reference voltage are respectively a positive I bisection bias voltage and a negative I bisection bias voltage, or voltages in the vicinity of the positive I bisection bias voltage and the negative I bisection bias voltage. Therefore, the first reference voltage=positive I bisection bias voltage+first parameter, and the second reference voltage=negative I bisection bias voltage+second parameter. The third reference voltage and the fourth reference voltage are respectively a positive Q bisection bias voltage and a negative Q bisection bias voltage, or voltages in the vicinity of the positive Q bisection bias voltage and the negative Q bisection bias voltage. Therefore, the third reference voltage=positive Q bisection bias voltage+first parameter, and the fourth reference voltage=negative Q bisection bias voltage+second parameter. The fifth reference voltage and the sixth reference voltage are respectively a P valley-peak bias voltage and a P valley-bottom bias voltage, or voltages in the vicinity of the P valley-peak bias voltage and the P valley-bottom bias voltage. Therefore, the fifth reference voltage=P valley-peak bias voltage+first parameter, and the sixth reference voltage=P valley-bottom bias voltage+second parameter. The seventh reference voltage and the eighth reference voltage are respectively a P valley-peak bias voltage and a P valley-bottom bias voltage, or voltages in the vicinity of the P valley-peak bias voltage and the P valley-bottom bias voltage. Therefore, the seventh reference voltage=P valley-peak bias voltage+first parameter, and the eighth reference voltage=P valley-bottom bias voltage+second parameter.

The Q error feedback coefficient is calculated using a first calculation formula:

$$f_Q = c_Q * \frac{V_Q}{A_Q * \pi}$$

wherein $f_Q$ denotes the Q error feedback coefficient, $V_Q$ denotes the Q half-wave voltage, $A_Q$ denotes the amplitude of the positive Q reference harmonic component or the negative Q reference harmonic component, and $c_Q$ denotes a constant;

The I error feedback coefficient is calculated using a second calculation formula:

$$f_I = c_I * \frac{V_I}{A_I * \pi}$$

wherein $f_I$ denotes the I error feedback coefficient, $V_I$ denotes the I half-wave voltage, $A_I$ denotes the amplitude of the positive I reference harmonic component or the negative I reference harmonic component, and $c_I$ denotes a constant.

The direct error feedback coefficient is calculated using a third calculation formula:

$$f_{p'} = c' * \frac{V_p}{A_{p'} * \pi}$$

wherein $f_{p'}$ denotes the direct error feedback coefficient, $V_p$ denotes the P half-wave voltage, $A_{p'}$ denotes the amplitude of the positive direct reference harmonic component or the negative direct reference harmonic component, and $c'$ denotes a constant.

The mixed-frequency error feedback coefficient is calculated using a fourth calculation formula:

$$f_{p''} = c'' * \frac{V_p}{A_{p''} * \pi}$$

wherein $f_{p''}$ denotes the direct error feedback coefficient, $V_p$ denotes the P half-wave voltage, $A_{p''}$ denotes the amplitude of the positive direct reference harmonic component or the negative direct reference harmonic component, and $c''$ denotes a constant.

To prevent over-high or over-low new bias voltages, and prevent impacts caused to the modulation performance of the optical modulator, the new operating bias voltage obtained via calculation may be detected. When the new operating bias voltage is over-high or over-low, a back adjustment is made. In this case, the processor 304 is configured to:

upon calculating the new I bias voltage, the new Q bias voltage and the new P bias voltage, judge whether the new I bias voltage is within a first voltage threshold range, judge whether the new Q bias voltage is within a second voltage threshold range, and judge whether the new P bias voltage is within a third voltage threshold range;

if the new I bias voltage is less than a minimum value of the first voltage threshold range, use a sum of the new I bias voltage and an even multiple of the half-wave voltage as a new I bias voltage, and perform the step of using the new I bias voltage as the I bias voltage; or if the new I bias voltage is greater than a maximum value of the first voltage threshold range, use a difference between the new I bias voltage and an even multiple of the half-wave voltage as a new I bias voltage, and perform the step of using the new I bias voltage as the I bias voltage; or if the new Q bias voltage is less than a minimum value of the second voltage threshold range, use a sum of the new Q bias voltage and an even multiple of the Q half-wave voltage as a new Q bias voltage, and perform the step of using the new Q bias voltage as the Q bias voltage; or if the new Q bias voltage is greater than a maximum value of the second voltage threshold range, use a difference between the new Q bias voltage and an even multiple of the Q half-wave voltage as a new Q bias voltage, and perform the step of using the new Q bias voltage as the Q bias voltage; or if the new P bias voltage is less than a minimum value of the third voltage threshold range, use a sum of the new P bias voltage and an even multiple of the P half-wave voltage as a new P bias voltage, and perform the step of using the new P bias voltage as the P bias voltage; or if the new P bias voltage is greater than a maximum of the third voltage threshold range, using a difference between the new P bias voltage and an even multiple of the P half-wave voltage as a new P bias voltage, and performing the step of using the new P bias voltage as the P bias voltage.

It should be noted that the optical-electrical converter 302 may also be independently arranged outside the apparatus 20 as an independent device, or may be built-in the optical modulator as a part of the optical modulator. In the later case, the desired optical signal may be directly obtained from the built-in optical-electrical converter of the optical modulator, instead of obtaining the optical signal via a light splitter.

The apparatus may further include an amplifier 306 and an input device 307. The input device 307 is configured to receive a selection instruction input by a user, wherein the selection instruction is used for specifying whether to select a scanning voltage corresponding to the maximum direct current component or select a scanning voltage corresponding to the minimum direct current component.

The amplifier 306 is arranged between the filter 303 and the optical-electrical converter 302. The amplifier 306 is configured to amplify electrical signals converted by the optical-electrical converter 302, such that the performance of the electrical signals received by the filter 303 each time is consistent.

In the embodiment of the present disclosure, after the I modulation module modulates the optical signal based on the I bias voltage, the I dither signal and the input I radio frequency signal, the Q modulation module modulates the optical signal based on the Q bias voltage, the Q dither signal and the input Q radio frequency signal, and the P phase shifting module modulates the optical signal based on the P bias voltage, the I harmonic phase and the I harmonic amplitude of the I harmonic component with respect to the I modulation module, the Q harmonic amplitude and the Q harmonic phase of the Q harmonic component with respect to the Q modulation module, and the P feedback signal amplitude and the P feedback signal phase of the P feedback signal with respect to the P phase shifting module are obtained; the new I bias voltage is calculated based on the I harmonic phase and the I reference phase in combination with the I error feedback coefficient, the I bias voltage and the I harmonic amplitude; the new Q bias voltage is calculated based on the Q harmonic phase and the Q reference phase in combination with the Q error feedback coefficient, the Q bias voltage and the Q harmonic amplitude; and the new P bias voltage is calculated based on the P feedback signal phase and the P reference phase in combination with the P error feedback coefficient, the P bias voltage and the P feedback signal amplitude, and the corresponding new bias voltages are input again to the I modulation module, the Q modulation module and the P phase shifting module. In this way, according to the present disclosure, in the operating process of the optical modulator, the bias voltage is constantly corrected, such that the operating performance of the optical modulator is more stable.

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A method for automatically controlling a bias voltage of an optical modulator, wherein the optical modulator comprises an I modulation module, a Q modulation module and a P phase shifting module, the I modulation module and the Q modulation module being configured to parallelly receive an input optical signal, the P phase shifting module being connected in series to the Q modulation module, the optical signal being modulated by the Q modulation module being input to the P phase shifting module for modulation, the optical signal output by the P phase shifting module being combined with the optical signal output by the I modulation module and then being output;

wherein the method comprises:
obtaining an I dither amplitude and an initial I bias voltage with respect to the I modulation module, a Q dither amplitude and an initial Q bias voltage with respect to the Q modulation module, and an initial P bias voltage with respect to the P phase shifting module;
obtaining an I reference phase and an I error feedback coefficient with respect to the I modulation module, a Q reference phase and a Q error feedback coefficient with respect to the Q modulation module, and a P reference phase and a P error feedback coefficient with respect to the P phase shifting module;
using the initial I bias voltage as an I bias voltage, using the initial P bias voltage as a P bias voltage, and using the initial Q bias voltage as a Q bias voltage;
inputting the I bias voltage and an I dither signal to the I modulation module, inputting the Q bias voltage and a Q dither signal to the Q modulation module, and inputting the P bias voltage to the P phase shifting module, wherein an amplitude of the I dither signal is the I dither amplitude, and an amplitude of the Q dither signal is the Q dither amplitude;

acquiring an output optical signal that is modulated by the I modulation module based on the I bias voltage, the I dither signal and an input I radio frequency signal, modulated by the Q modulation module based on the Q bias voltage, the Q dither signal and an input Q radio frequency signal, and modulated by the P phase shifting module based on the P bias voltage;

converting the output optical signal into an electrical signal, and acquiring an alternating current component from the electrical signal;

extracting an I harmonic component with respect to the I modulation module, a Q harmonic component with respect to the Q modulation module, and a P feedback signal with respect to the P phase shifting module from the alternating current component;

calculating an I harmonic amplitude and an I harmonic phase of the I harmonic component, a Q harmonic amplitude and a Q harmonic phase of the Q harmonic component, and a P feedback signal amplitude and a P feedback signal phase of the P feedback signal;

calculating a new I bias voltage based on the I harmonic phase and the I reference phase in combination with the I error feedback coefficient, the I bias voltage and the I harmonic amplitude, calculating a new Q bias voltage based on the Q harmonic phase and the Q reference phase in combination with the Q error feedback coefficient, the Q bias voltage and the Q harmonic amplitude, and calculating a new P bias voltage based on the P feedback signal phase and the P reference phase in combination with the P error feedback coefficient, the P bias voltage and the P feedback signal amplitude; and using the new I bias voltage as the I bias voltage, using the new Q bias voltage as the Q bias voltage, using the new P bias voltage as the P bias voltage, and returning to the step of inputting the I bias voltage and an I dither signal to the I modulation module, inputting the Q bias voltage and a Q dither signal to the Q modulation module, and inputting the P bias voltage to the P phase shifting module.

2. The method according to claim 1, wherein the P feedback signal comprises a mixed-frequency harmonic component, the P reference phase comprises a mixed-frequency reference phase of the mixed-frequency harmonic component, the P feedback signal amplitude comprises a mixed-frequency harmonic amplitude of the mixed-frequency harmonic component, the P feedback signal phase comprises a mixed-frequency harmonic phase of the mixed-frequency harmonic component, and the P error feedback coefficient comprises a mixed-frequency error feedback coefficient, and wherein the mixed-frequency harmonic component comprises a difference-frequency harmonic component between the I dither signal and the Q dither signal and/or a sum-frequency harmonic component between the I dither signal and the Q dither signal.

3. The method according to claim 2, wherein the step of calculating a new P bias voltage based on the P feedback signal phase and the P reference phase in combination with the P error feedback coefficient, the P bias voltage and the P feedback signal amplitude comprises:

calculating the new P bias voltage based on the mixed-frequency harmonic phase and the mixed-frequency reference phase in combination with the mixed-frequency error feedback coefficient, the P bias voltage and the mixed-frequency harmonic amplitude.

4. The method according to claim 2, wherein the P feedback signal further comprises a direct harmonic component, the P feedback signal amplitude further comprises a direct harmonic amplitude of the direct harmonic component, the P feedback signal phase further comprises a direct harmonic phase of the direct harmonic component, the P reference phase further comprises a direct reference phase of the direct harmonic component, and the P error feedback coefficient further comprises a direct error feedback coefficient;

the method further comprises:

obtaining a P dither amplitude with respect to the P phase shifting module while obtaining the initial P bias voltage with respect to the P phase shifting module;

inputting a P dither signal to the P phase shifting module while inputting the P bias voltage to the P phase shifting module, such that the P phase shifting module performs modulation based on the P bias voltage and the P dither signal, wherein an amplitude of the P dither signal is the P dither amplitude;

the step of calculating a P feedback signal amplitude and a P feedback signal phase of the P feedback signal comprises:

calculating the direct harmonic amplitude and the direct harmonic phase of the direct harmonic component, and the mixed-frequency harmonic amplitude and the mixed-frequency harmonic phase of the mixed-frequency harmonic component; and the step of calculating a new P bias voltage based on the P feedback signal phase and the P reference phase in combination with the P error feedback coefficient, the P bias voltage and the P feedback signal amplitude comprises:

judging whether the direct harmonic amplitude is greater than or equal to a predetermined threshold, calculating the new P bias voltage based on the direct harmonic phase and the direct reference phase in combination with the direct error feedback coefficient, the P bias voltage and the direct harmonic amplitude if the direct harmonic amplitude is greater than or equal to the predetermined threshold, and calculating the new P bias voltage based on the mixed-frequency harmonic phase and the mixed-frequency reference phase in combination with the mixed-frequency error feedback coefficient, the P bias voltage and the mixed-frequency harmonic amplitude if the direct harmonic amplitude is less than the predetermined threshold;

or calculating a first intermediate P bias voltage based on the direct harmonic phase and the direct reference phase in combination with the direct error feedback coefficient, the P bias voltage and the direct harmonic amplitude, calculating a second intermediate P bias voltage based on the mixed-frequency harmonic phase and the mixed-frequency reference phase in combination with the mixed-frequency error feedback coefficient, the P bias voltage and the mixed-frequency harmonic amplitude, and calculating the new P bias voltage based on the first intermediate P bias voltage, the second intermediate P bias voltage and the P bias voltage.

5. The method according to claim 4, wherein the step of obtaining an I dither amplitude and an initial I bias voltage with respect to the I modulation module, a Q dither amplitude and an initial Q bias voltage with respect to the Q modulation module, and a P dither signal and an initial P bias voltage with respect to the P phase shifting module comprises:

respectively inputting a first predetermined voltage and a second predetermined voltage to the Q modulation module and the P phase shifting module, sequentially inputting a plurality of first scanning voltages to the I modulation module, acquiring output optical signals corresponding to the plurality of first scanning voltages, converting the output optical signals corresponding to the plurality of first scanning voltages into electrical signals corresponding to the plurality of first scanning voltages, extracting a plurality of first direct current components corresponding to the plurality of first scanning voltages from the electrical signals corresponding to the plurality of first scanning voltages, obtaining a first direct current component having a maximum value from the plurality of first direct current components as a first maximum direct current component, and obtaining a first direct current component having a minimum value from the plurality of first direct current components as a first minimum direct current component; and inputting a third predetermined voltage to the I modulation module, inputting the second predetermined voltage to the P phase shifting module, sequentially inputting a plurality of second scanning voltages to the Q modulation module, acquiring output optical signals corresponding to the plurality of second scanning voltages, converting the output optical signals corresponding to the plurality of second scanning voltages into electrical signals corresponding to the plurality of second scanning voltages, extracting a plurality of second direct current components corresponding to the plurality of second scanning voltages from the electrical signals corresponding to the plurality of second scanning voltages, obtaining a second direct current component having a maximum value from the plurality of second direct current components as a second maximum direct current component, and obtaining a second direct current component having a minimum value from the plurality of second direct current components as a second minimum direct current component;

inputting a first scanning voltage corresponding to the first maximum direct current component or a first scanning voltage corresponding to the first minimum direct current component to the I modulation module, inputting a second scanning voltage corresponding to the second maximum direct current component or a second scanning voltage corresponding to the second minimum direct current component to the Q modulation module, and inputting a plurality of third scanning voltages to the P phase shifting module;

acquiring output optical signals corresponding to the plurality of third scanning voltages, converting the output optical signals corresponding to the plurality of third scanning voltages into electrical signals corresponding to the plurality of third scanning voltages, and extracting a plurality of third direct current components corresponding to the plurality of third scanning voltages from the electrical signals corresponding to the plurality of third scanning voltages;

calculating the P dither amplitude and the initial P bias voltage with respect to the P phase shifting module based on the plurality of third direct current components; and inputting the first predetermined voltage to the Q modulation module, inputting a positive bisection bias voltage or a negative bisection bias voltage to the P phase shifting module, inputting a plurality of fourth scanning voltages to the I modulation module, acquiring output optical signals corresponding to the plurality of fourth scanning voltages, converting the output optical signals corresponding to the plurality of fourth scanning voltages into electrical signals corresponding to the plurality of fourth scanning voltages, extracting a plurality of fourth direct current components corresponding to the plurality of fourth scanning voltages from the electrical signals corresponding to the plurality of fourth scanning voltages, and calculating the I dither amplitude and the initial I bias voltage with respect to the I modulation module based on the plurality of fourth direct current components; and inputting the third predetermined voltage to the I modulation module, inputting a positive bisection bias voltage or a negative bisection bias voltage to the P phase shifting module, inputting a plurality of fifth scanning voltages to the Q modulation module, acquiring output optical signals corresponding to the plurality of fifth scanning voltages, converting the output optical signals corresponding to the plurality of fifth scanning voltages into electrical signals corresponding to the plurality of fifth scanning voltages, extracting a plurality of fifth direct current components corresponding to the plurality of fifth scanning voltages from the electrical signals corresponding to the plurality of fifth scanning voltages, and calculating the Q dither amplitude and the initial Q bias voltage with respect to the Q modulation module based on the plurality of fifth direct current components.

6. The method according to claim 5, wherein the initial I bias voltage comprises an I valley-peak bias voltage, an I valley-bottom bias voltage, a positive I bisection bias voltage, and a negative I bisection bias voltage;

the step of using the initial I bias voltage as an I bias voltage comprises: using one of the I valley-peak bias voltage, the I valley-bottom bias voltage, the positive I bisection bias voltage and the negative I bisection bias voltage as the I bias voltage;

the initial Q bias voltage comprises a Q valley-peak bias voltage, a Q valley-bottom bias voltage, a positive Q bisection bias voltage, and a negative Q bisection bias voltage;

the step of using the initial Q bias voltage as a Q bias voltage comprises: using one of the Q valley-peak bias voltage, the Q valley-bottom bias voltage, the positive Q bisection bias voltage and the negative Q bisection bias voltage as the Q bias voltage;

the initial P bias voltage comprises a P valley-peak bias voltage, a P valley-bottom bias voltage, a positive P bisection bias voltage, and a negative P bisection bias voltage;

the step of using the initial P bias voltage as a P bias voltage comprises: using one of the P valley-peak bias voltage, the P valley-bottom bias voltage, the positive P bisection bias voltage and the negative P bisection bias voltage as the P bias voltage;

the I reference phase comprises a positive I reference phase and a negative I reference phase, the Q reference phase comprises a positive Q reference phase and a negative Q reference phase, the direct reference phase comprises a positive direct reference phase and a negative direct reference phase, and the mixed-frequency reference phase comprises a positive mixed-frequency reference phase and a negative mixed-frequency reference phase;

the method further comprises:

calculating a P half-wave voltage with respect to the P phase shifting module while calculating the P dither amplitude and the initial P bias voltage with respect to the P phase shifting module based on the plurality of third direct current components;

calculating an I half-wave voltage with respect to the I modulation module while calculating the I dither amplitude and the initial I bias voltage with respect to the I modulation module based on the plurality of fourth direct current components;

and calculating a Q half-wave voltage with respect to the Q modulation module while calculating the Q dither amplitude and the initial Q bias voltage with respect to the Q modulation module based on the plurality of fifth direct current components;

the step of obtaining an I reference phase and an I error feedback coefficient with respect to the I modulation module, a Q reference phase and a Q error feedback coefficient with respect to the Q modulation module, and a P reference phase and a P error feedback coefficient with respect to the P phase shifting module comprises:

inputting the Q valley-bottom bias voltage to the Q modulation module, inputting the positive P bisection bias voltage or the negative P bisection bias voltage to the P phase shifting module, inputting a first dither signal to the I modulation module, sequentially inputting a first reference voltage and a second reference voltage to the I modulation module, respectively obtaining a positive I reference harmonic component corresponding to the first reference voltage with respect to the I modulation module and a negative I reference harmonic component corresponding to the second reference voltage with respect to the I modulation module, using a phase of the positive I reference harmonic component as the positive I reference phase, using a phase of the negative I reference harmonic component as the negative I reference phase, and calculating the I error feedback coefficient based on an amplitude of the positive I reference harmonic component, an amplitude of the negative I reference harmonic component and the I half-wave voltage, wherein the first reference voltage and the second reference voltage are obtained via calculation based on the initial I bias voltage;

inputting the I valley-bottom bias voltage to the I modulation module, inputting the positive P bisection bias voltage or the negative P bisection bias voltage to the P phase shifting module, inputting a second dither signal to the Q modulation module, sequentially inputting a third reference voltage and a fourth reference voltage to the Q modulation module, respectively obtaining a positive Q reference harmonic component corresponding to the third reference voltage with respect to the Q modulation module and a negative Q reference harmonic component corresponding to the fourth reference voltage with respect to the Q modulation module, using a phase of the positive Q reference harmonic component as the positive Q reference phase, using a phase of the negative Q reference harmonic component as the negative Q reference phase, and calculating the Q error feedback coefficient based on an amplitude of the positive Q reference harmonic component, an amplitude of the negative Q reference harmonic component and the Q half-wave voltage, wherein the third reference voltage and the fourth reference voltage are obtained via calculation based on the initial Q bias voltage;

respectively inputting the I valley-bottom bias voltage and the Q valley-bottom bias voltage to the I modulation module and the Q modulation module, inputting a third dither signal to the P phase shifting module, sequentially inputting a fifth reference voltage and a sixth reference voltage to the P phase shifting module, respectively obtaining a positive direct reference harmonic component corresponding to the fifth reference voltage with respect to the P phase shifting module and a negative direct reference harmonic component corresponding to the sixth reference voltage with respect to the P phase shifting module, using a phase of the negative direct reference harmonic component as the negative direct reference phase, using a phase of the positive direct reference harmonic component as the positive direct reference phase, and calculating the direct error feedback coefficient based on an amplitude of the negative direct reference harmonic component, an amplitude of the positive direct reference harmonic component and the P half-wave voltage, wherein the fifth reference voltage and the sixth reference voltage are obtained via calculation based on the initial P bias voltage; and inputting the I valley-bottom bias voltage and the I dither signal to the I modulation module, inputting the Q valley-bottom bias voltage and the Q dither signal to the Q modulation module, sequentially inputting a seventh reference voltage and an eighth reference voltage to the P phase shifting module, respectively obtaining a positive mixed-frequency reference harmonic component corresponding to the seventh reference voltage with respect to the P phase shifting module and a negative mixed-frequency reference harmonic component corresponding to the eighth reference voltage with respect to the P phase shifting module, using a phase of the negative mixed-frequency reference harmonic component as the negative mixed-frequency reference phase, using a phase of the positive mixed-frequency reference harmonic component as the positive mixed-frequency reference phase, and calculating the mixed-frequency error feedback coefficient based on an amplitude of the negative mixed-frequency reference harmonic component, an amplitude of the positive mixed-frequency reference harmonic component and the P half-wave voltage, wherein the seventh reference voltage and the eighth reference voltage are obtained via calculation based on to the initial P bias voltage.

7. The method according to claim 6, wherein the Q error feedback coefficient is calculated using a first calculation formula:

$$f_Q = c_Q * \frac{V_Q}{A_Q * \pi}$$

wherein $f_Q$ denotes the Q error feedback coefficient, $V_Q$ denotes the Q half-wave voltage, $A_Q$ denotes the amplitude of the positive Q reference harmonic component or the negative Q reference harmonic component, and $c_Q$ denotes a constant;

the I error feedback coefficient is calculated using a second calculation formula:

$$f_I = c_I * \frac{V_I}{A_I * \pi}$$

wherein $f_I$ denotes the I error feedback coefficient, $V_I$ denotes the I half-wave voltage, $A_I$ denotes the amplitude of the positive I reference harmonic component or the negative I reference harmonic component, and $c_I$ denotes a constant;

the direct error feedback coefficient is calculated using a third calculation formula:

$$f_{p'} = c' * \frac{V_p}{A_{p'} * \pi}$$

wherein $f_{p'}$ denotes the direct error feedback coefficient, $V_p$ denotes the P half-wave voltage, $A_{p'}$ denotes the amplitude of the positive direct reference harmonic component or the negative direct reference harmonic component, and c' denotes a constant;

the mixed-frequency error feedback coefficient is calculated using a fourth calculation formula:

$$f_{p''} = c'' * \frac{V_p}{A_{p''} * \pi}$$

wherein $f_{p''}$ denotes the direct error feedback coefficient, $V_p$ denotes the P half-wave voltage, $A_{p''}$ denotes the amplitude of the positive direct reference harmonic component or the negative direct reference harmonic component, and c" denotes a constant.

8. The method according to claim 6, wherein
upon the step of calculating the new I bias voltage, the new Q bias voltage and the new P bias voltage, the method further comprises:
judging whether the new I bias voltage is within a first voltage threshold range, judging whether the new Q bias voltage is within a second voltage threshold range, and judging whether the new P bias voltage is within a third voltage threshold range;
if the new I bias voltage is less than a minimum value of the first voltage threshold range, using a sum of the new I bias voltage and an even multiple of the I half-wave voltage as a new I bias voltage, and performing the step of using the new I bias voltage as the I bias voltage; or
if the new I bias voltage is greater than or equal to a maximum value of the first voltage threshold range, using a difference between the new I bias voltage and an even multiple of the I half-wave voltage as a new I bias voltage, and performing the step of using the new I bias voltage as the I bias voltage; or
if the new Q bias voltage is less than a minimum value of the second voltage threshold range, using a sum of the new Q bias voltage and an even multiple of the Q half-wave voltage as a new Q bias voltage, and performing the step of using the new Q bias voltage as the Q bias voltage; or
if the new Q bias voltage is greater than or equal to a maximum value of the second voltage threshold range, using a difference between the new Q bias voltage and an even multiple of the Q half-wave voltage as a new Q bias voltage, and performing the step of using the new Q bias voltage as the Q bias voltage; or
if the new P bias voltage is less than a minimum value of the third voltage threshold range, using a sum of the new P bias voltage and an even multiple of the P half-wave voltage as a new P bias voltage, and performing the step of using the new P bias voltage as the P bias voltage; or
if the new P bias voltage is greater than a maximum of the third voltage threshold range, using a difference between the new P bias voltage and an even multiple of the P half-wave voltage as a new P bias voltage, and performing the step of using the new P bias voltage as the P bias voltage.

9. An apparatus for automatically controlling a bias voltage of an IQ optical modulator, wherein the IQ optical modulator comprises an I modulation module, a Q modulation module and a P phase shifting module, the I modulation module and the Q modulation module being configured to parallelly receive an input optical signal, the P phase shifting module being connected in series to the Q modulation module, the optical signal being modulated by the Q modulation module being input to the P phase shifting module for modulation, the optical signal output by the P phase shifting module being combined with the optical signal output by the I modulation module and then being output;
wherein the apparatus comprises: a processor, an optical-electrical converter, a filter, and an output device; wherein
the processor is configured to: obtain an I dither amplitude and an initial I bias voltage with respect to the I modulation module, a Q dither amplitude and an initial Q bias voltage with respect to the Q modulation module, and an initial P bias voltage with respect to the P phase shifting module; obtain an I reference phase and an I error feedback coefficient with respect to the I modulation module, a Q reference phase and a Q error feedback coefficient with respect to the Q modulation module, and a P reference phase and a P error feedback coefficient with respect to the P phase shifting module; use the initial I bias voltage as an I bias voltage, use the initial P bias voltage as a P bias voltage, and use the initial Q bias voltage as a Q bias voltage; and send the Q bias voltage, the I bias voltage and the P bias voltage to the output device;
the output device is configured to: input the I bias voltage and an I dither signal to the I modulation module, input the Q bias voltage and a Q dither signal to the Q modulation module, and input the P bias voltage to the P phase shifting module, wherein an amplitude of the I dither signal is the I dither amplitude, and an amplitude of the Q dither signal is the Q dither amplitude;
the optical-electrical converter is configured to: acquire, via a light splitter, an output optical signal that is modulated by the I modulation module based on the I bias voltage, the I dither signal and an input I radio frequency signal, modulated by the Q modulation module based on the Q bias voltage, the Q dither signal and an input Q radio frequency signal, and modulated by the P phase shifting module based on the P bias voltage, and convert the output optical signal into an electrical signal;
the filter is configured to extract an alternating current component from the electrical signal;
the processor is configured to extract an I harmonic component with respect to the I modulation module, a Q harmonic component with respect to the Q modulation module, and a P feedback signal with respect to the P phase shifting module from the alternating current component;

the processor is configured to: calculate an I harmonic amplitude and an I harmonic phase of the I harmonic component, a Q harmonic amplitude and a Q harmonic phase of the Q harmonic component, and a P feedback signal amplitude and a P feedback signal phase of the P feedback signal; calculate a new I bias voltage based on the I harmonic phase and the I reference phase in combination with the I error feedback coefficient, the I bias voltage and the I harmonic amplitude, calculate a new Q bias voltage based on the Q harmonic phase and the Q reference phase in combination with the Q error feedback coefficient, the Q bias voltage and the Q harmonic amplitude, and calculate a new P bias voltage based on the P feedback signal phase and the P reference phase in combination with the P error feedback coefficient, the P bias voltage and the P feedback signal amplitude; and use the new I bias voltage as the I bias voltage, use the new Q bias voltage as the Q bias voltage, use the new P bias voltage as the P bias voltage, and send the Q bias voltage, the I bias voltage and the P bias voltage to the output device, such that the output device inputs the I bias voltage and the I dither signal to the I modulation module, and inputs the Q bias voltage and the Q dither signal to the Q modulation module, and inputs the P bias voltage to the P phase shifting module.

10. The apparatus according to claim 9, wherein the P feedback signal comprises a mixed-frequency harmonic component, the P reference phase comprises a mixed-frequency reference phase of the mixed-frequency harmonic component, the P feedback signal amplitude comprises a mixed-frequency harmonic amplitude of the mixed-frequency harmonic component, the P feedback signal phase comprises a mixed-frequency harmonic phase of the mixed-frequency harmonic component, and the P error feedback coefficient comprises a mixed-frequency error feedback coefficient, wherein the mixed-frequency harmonic component comprises a difference-frequency harmonic component between the I dither signal and the Q dither signal and/or a sum-frequency harmonic component between the I dither signal and the Q dither signal.

11. The apparatus according to claim 10, wherein the processor being configured to calculate a new P bias voltage based on the P feedback signal phase and the P reference phase in combination with the P error feedback coefficient, the P bias voltage and the P feedback signal amplitude comprises:

the processor is configured to calculate the new P bias voltage based on the mixed-frequency harmonic phase and the mixed-frequency reference phase in combination with the mixed-frequency error feedback coefficient, the P bias voltage and the mixed-frequency harmonic amplitude.

12. The apparatus according to claim 10, wherein the P feedback signal further comprises a direct harmonic component, the P feedback signal amplitude further comprises a direct harmonic amplitude of the direct harmonic component, the P feedback signal phase further comprises a direct harmonic phase of the direct harmonic component, the P reference phase further comprises a direct reference phase of the direct harmonic component, and the P error feedback coefficient further comprises a direct error feedback coefficient;

the processor is further configured to obtain a P dither amplitude with respect to the P phase shifting module while obtaining the initial P bias voltage with respect to the P phase shifting module;

the output device is further configured to input a P dither signal to the P phase shifting module while inputting the P bias voltage to the P phase shifting module, such that the P phase shifting module performs modulation based on the P bias voltage and the P dither signal, wherein an amplitude of the P dither signal is the P dither amplitude;

the processor being configured to calculate a P feedback signal amplitude and a P feedback signal phase of the P feedback signal comprises:

the processor is configured to calculate the direct harmonic amplitude and the direct harmonic phase of the direct harmonic component, and the mixed-frequency harmonic amplitude and the mixed-frequency harmonic phase of the mixed-frequency harmonic component; and the processor being configured to calculate a new P bias voltage based on the P feedback signal phase and the P reference phase in combination with the P error feedback coefficient, the P bias voltage and the P feedback signal amplitude comprises:

the processor is configured to:

judge whether the direct harmonic amplitude is greater than or equal to a predetermined threshold, calculate the new P bias voltage based on the direct harmonic phase and the direct reference phase in combination with the direct error feedback coefficient, the initial P bias voltage and the direct harmonic amplitude if the direct harmonic amplitude is greater than or equal to the predetermined threshold, and calculate the new P bias voltage based on the mixed-frequency harmonic phase and the mixed-frequency reference phase in combination with the mixed-frequency error feedback coefficient, the initial P bias voltage and the mixed-frequency harmonic amplitude if the direct harmonic amplitude is less than the predetermined threshold;

or calculate a first intermediate P bias voltage based on the direct harmonic phase and the direct reference phase in combination with the direct error feedback coefficient, the P bias voltage and the direct harmonic amplitude, calculate a second intermediate P bias voltage based on the mixed-frequency harmonic phase and the mixed-frequency reference phase in combination with the mixed-frequency error feedback coefficient, the P bias voltage and the mixed-frequency harmonic amplitude, and calculate the new P bias voltage based on the first intermediate P bias voltage, the second intermediate P bias voltage and the P bias voltage.

13. The apparatus according to claim 12, wherein the processor being configured to: obtain an I dither amplitude and an initial I bias voltage with respect to the I modulation module, a Q dither amplitude and an initial Q bias voltage with respect to the Q modulation module, and an initial P bias voltage with respect to the P phase shifting module comprises: the processor is configured to:

via the output device, respectively input a first predetermined voltage and a second predetermined voltage to the Q modulation module and the P phase shifting module, sequentially input a plurality of first scanning voltages to the I modulation module, acquire output optical signals output by the light splitter and corresponding to the plurality of first scanning voltages via the optical-electrical converter, convert the output optical signals corresponding to the plurality of first scanning voltages into electrical signals corresponding to the plurality of first scanning voltages via the optical-electrical converter, extract a plurality of first direct current components corresponding to the plurality of first scanning voltages from the electrical signals corresponding to the plurality of first scanning voltages via the filter, obtain a first direct current component having a maximum value from the plurality of first direct current components as a first maximum direct current component, and obtain a first direct current component having a minimum value from the plurality of first direct current components as a first minimum direct current component; and via the output device, input a third predetermined voltage to the I modulation module, input the second predetermined voltage to the P phase shifting module, sequentially input a plurality of second scanning voltages to the Q modulation module, acquire output optical signals output by the light splitter and corresponding to the plurality of second scanning voltages via the optical-electrical converter, convert the output optical signals corresponding to the plurality of second scanning voltages into electrical signals corresponding to the plurality of second scanning voltages via the optical-electrical converter, extract a plurality of second direct current components corresponding to the plurality of second scanning voltages from the electrical signals corresponding to the plurality of second scanning voltages via the filter, obtain a second direct current component having a maximum value from the plurality of second direct current components as a second maximum direct current component, and obtain a second direct current component having a minimum value from the plurality of second direct current components as a second minimum direct current component;

via the output device, input a first scanning voltage corresponding to the first maximum direct current component or a first scanning voltage corresponding to the first minimum direct current component to the I modulation module, input a second scanning voltage corresponding to the second maximum direct current component or a second scanning voltage corresponding to the second minimum direct current component to the Q modulation module, and input a plurality of third scanning voltages to the P phase shifting module;

acquire output optical signals output by the light splitter and corresponding to the plurality of third scanning voltages via the optical-electrical converter, convert the output optical signals corresponding to the plurality of third scanning voltages into electrical signals corresponding to the plurality of third scanning voltages via the optical-electrical converter, and extract a plurality of third direct current components corresponding to the plurality of third scanning voltages from the electrical signals corresponding to the plurality of third scanning voltages via the filter;

calculate the P dither amplitude and the initial P bias voltage with respect to the P phase shifting module based on the plurality of third direct current components; and via the output device, input a first predetermined voltage to the Q modulation module, inputting a positive bisection bias voltage or a negative bisection bias voltage to the P phase shifting module, input a plurality of fourth scanning voltages to the I modulation module, acquire output optical signals output by the light splitter and corresponding to the plurality of fourth scanning voltages via the optical-electrical converter, convert the output optical signals corresponding to the plurality of fourth scanning voltages into electrical signals corresponding to the plurality of fourth scanning voltages via the optical-electrical converter, extract a plurality of fourth direct current components corresponding to the plurality of fourth scanning voltages from the electrical signals corresponding to the plurality of fourth scanning voltages via the filter, and calculate the I dither amplitude and the initial I bias voltage with respect to the I modulation module based on the plurality of fourth direct current components; and input the third predetermined voltage to the I modulation module, input the positive bisection bias voltage or the negative bisection bias voltage to the P phase shifting module, input a plurality of fifth scanning voltages to the Q modulation module, acquire output optical signals output by the light splitter and corresponding to the plurality of fifth scanning voltages via the optical-electrical converter, convert the optical signals corresponding to the plurality of fifth scanning voltages into electrical signals corresponding to the plurality of fifth scanning voltages via the optical-electrical converter, extract a plurality of fifth direct current components corresponding to the plurality of fifth scanning voltages from the electrical signals corresponding to the plurality of fifth scanning voltages via the filter, and calculate the Q dither amplitude and the initial Q bias voltage with respect to the Q modulation module based on the plurality of fifth direct current components.

14. The apparatus according to claim 13, wherein
the initial I bias voltage comprises an I valley-peak bias voltage, an I valley-bottom bias voltage, a positive I bisection bias voltage, and a negative I bisection bias voltage;
the processor being configured to use the initial I bias voltage as an I bias voltage comprises: the processor is configured to use one of the I valley-peak bias voltage, the I valley-bottom bias voltage, the positive I bisection bias voltage and the negative I bisection bias voltage as the I bias voltage;
the initial Q bias voltage comprises a Q valley-peak bias voltage, a Q valley-bottom bias voltage, a positive Q bisection bias voltage, and a negative Q bisection bias voltage;
the processor being configured to use the initial Q bias voltage as an Q bias voltage comprises: the processor is configured to use one of the Q valley-peak bias voltage, the Q valley-bottom bias voltage, the positive Q bisection bias voltage and the negative Q bisection bias voltage as the Q bias voltage;
the initial P bias voltage comprises a P valley-peak bias voltage, a P valley-bottom bias voltage, a positive P bisection bias voltage, and a negative P bisection bias voltage;
the processor being configured to use the initial P bias voltage as an P bias voltage comprises: the processor is configured to use one of the P valley-peak bias voltage, the P valley-bottom bias voltage, the positive P bisection bias voltage and the negative P bisection bias voltage as the P bias voltage;
the I reference phase comprises a positive I reference phase and a negative I reference phase, the Q reference phase comprises a positive Q reference phase and a negative Q reference phase, the direct reference phase comprises a positive direct reference phase and a negative direct reference phase, and the mixed-frequency reference phase comprises a positive mixed-frequency reference phase and a negative mixed-frequency reference phase;

the processor is further configured to: calculate a P half-wave voltage with respect to the P phase shifting module while calculating the P dither amplitude and the initial P bias voltage with respect to the P phase shifting module based on the plurality of third direct current components; calculate an I half-wave voltage with respect to the I modulation module while calculating the I dither amplitude and the initial I bias voltage with respect to the I modulation module based on the plurality of fourth direct current components; and calculate a Q half-wave voltage with respect to the Q modulation module while calculating the Q dither amplitude and the initial Q bias voltage with respect to the Q modulation module based on the plurality of fifth direct current components;

the processor being configured to obtain an I reference phase and an I error feedback coefficient with respect to the I modulation module, a Q reference phase and a Q error feedback coefficient with respect to the Q modulation module, and a P reference phase and a P error feedback coefficient with respect to the P phase shifting module comprises:

the processor is configured to:

via the output device, input a Q valley-bottom bias voltage to the Q modulation module, input a positive P bisection bias voltage or a negative P bisection bias voltage to the P phase shifting module, input a first dither signal to the I modulation module, sequentially input a first reference voltage and a second reference voltage to the I modulation module, respectively obtain a positive I reference harmonic component corresponding to the first reference voltage with respect to the I modulation module and a negative I reference harmonic component corresponding to the second reference voltage with respect to the I modulation module, use a phase of the positive I reference harmonic component as the positive I reference phase, use a phase of the negative I reference harmonic component as the negative I reference phase, and calculate the I error feedback coefficient based on an amplitude of the positive I reference harmonic component, an amplitude of the negative I reference harmonic component and the I half-wave voltage, wherein the first reference voltage and the second reference voltage are obtained via calculation based on the initial I bias voltage;

via the output device, input an I valley-bottom bias voltage to the I modulation module, input a positive P bisection bias voltage or a negative P bisection bias voltage to the P phase shifting module, input a second dither signal to the Q modulation module, sequentially input a third reference voltage and a fourth reference voltage to the Q modulation module, respectively obtain a positive Q reference harmonic component corresponding to the third reference voltage with respect to the Q modulation module and a negative Q reference harmonic component corresponding to the fourth reference voltage with respect to the Q modulation module, use a phase of the positive Q reference harmonic component as the positive Q reference phase, use a phase of the negative Q reference harmonic component as the negative Q reference phase, and calculate the Q error feedback coefficient based on an amplitude of the positive Q reference harmonic component, an amplitude of the negative Q reference harmonic component and the Q half-wave voltage, wherein the third reference voltage and the fourth reference voltage are obtained via calculation based on the initial Q bias voltage;

via the output device, respectively input an I valley-bottom bias voltage and a Q valley-bottom bias voltage to the I modulation module and the Q modulation module, input a third dither signal to the P phase shifting module, sequentially input a fifth reference voltage and a sixth reference voltage to the P phase shifting module, respectively obtain a positive direct reference harmonic component corresponding to the fifth reference voltage with respect to the P phase shifting module and a negative direct reference harmonic component corresponding to the sixth reference voltage with respect to the P phase shifting module, use a phase of the negative direct reference harmonic component as the negative direct reference phase, use a phase of the positive direct reference harmonic component as the positive direct reference phase, and calculate the direct error feedback coefficient based on an amplitude of the negative direct reference harmonic component, an amplitude of the positive direct reference harmonic component and the P half-wave voltage, wherein the fifth reference voltage and the sixth reference voltage are obtained via calculation based on the initial P bias voltage; and via the output device, input an I valley-bottom bias voltage and an I dither signal to the I modulation module, input a Q valley-bottom bias voltage and a Q dither signal to the Q modulation module, sequentially input a seventh reference voltage and an eighth reference voltage to the P phase shifting module, respectively obtain a positive mixed-frequency reference harmonic component corresponding to the seventh reference voltage with respect to the P phase shifting module and a negative mixed-frequency reference harmonic component corresponding to the eighth reference voltage with respect to the P phase shifting module, use a phase of the negative mixed-frequency reference harmonic component as the negative mixed-frequency reference phase, use a phase of the positive mixed-frequency reference harmonic component as the positive mixed-frequency reference phase, and calculate the mixed-frequency error feedback coefficient based on an amplitude of the negative mixed-frequency reference harmonic component, an amplitude of the positive mixed-frequency reference harmonic component and the P half-wave voltage, wherein the seventh reference voltage and the eighth reference voltage are obtained via calculation based on the initial P bias voltage.

15. The apparatus according to claim 14, wherein the Q error feedback coefficient is calculated using a first calculation formula:

$$f_Q = c_Q * \frac{V_Q}{A_Q * \pi}$$

wherein $f_Q$ denotes the Q error feedback coefficient, $V_Q$ denotes the Q half-wave voltage, $A_Q$ denotes the amplitude of the positive Q reference harmonic component or the negative Q reference harmonic component, and $c_Q$ denotes a constant;

the I error feedback coefficient is calculated using a second calculation formula:

$$f_I = c_I * \frac{V_I}{A_I * \pi}$$

wherein $f_I$ denotes the I error feedback coefficient, $V_I$ denotes the I half-wave voltage, $A_I$ denotes the amplitude of the positive I reference harmonic component or the negative I reference harmonic component, and $c_I$ denotes a constant;

the direct error feedback coefficient is calculated using a third calculation formula:

$$f_{p'} = c' * \frac{V_p}{A_{p'} * \pi}$$

wherein $f_{p'}$ denotes the direct error feedback coefficient, $V_p$ denotes the P half-wave voltage, $A_{p'}$ denotes the amplitude of the positive direct reference harmonic component or the negative direct reference harmonic component, and c' denotes a constant;

the mixed-frequency error feedback coefficient is calculated using a fourth calculation formula:

$$f_{p''} = c'' * \frac{V_p}{A_{p''} * \pi}$$

wherein $f_{p''}$ denotes the direct error feedback coefficient, $V_p$ denotes the P half-wave voltage, $A_{p''}$ denotes the amplitude of the positive direct reference harmonic component or the negative direct reference harmonic component, and c" denotes a constant.

16. The apparatus according to claim 14, wherein
upon calculating the new I bias voltage, the new Q bias voltage and the new P bias voltage, the processor is further configured to:
judge whether the new I bias voltage is within a first voltage threshold range, judge whether the new Q bias voltage is within a second voltage threshold range, and judge whether the new P bias voltage is within a third voltage threshold range;
if the new I bias voltage is less than a minimum value of the first voltage threshold range, use a sum of the new I bias voltage and an even multiple of the half-wave voltage as a new I bias voltage, and perform the step of using the new I bias voltage as the I bias voltage; or
if the new I bias voltage is greater than or equal to a maximum value of the first voltage threshold range, use a difference between the new I bias voltage and an even multiple of the half-wave voltage as a new I bias voltage, and perform the step of using the new I bias voltage as the I bias voltage; or
if the new Q bias voltage is less than a minimum value of the second voltage threshold range, use a sum of the new Q bias voltage and an even multiple of the Q half-wave voltage as a new Q bias voltage, and perform the step of using the new Q bias voltage as the Q bias voltage; or
if the new Q bias voltage is greater than or equal to a maximum value of the second voltage threshold range, use a difference between the new Q bias voltage and an even multiple of the Q half-wave voltage as a new Q bias voltage, and perform the step of using the new Q bias voltage as the Q bias voltage; or
if the new P bias voltage is less than a minimum value of the third voltage threshold range, use a sum of the new P bias voltage and an even multiple of the P half-wave voltage as a new P bias voltage, and perform the step of using the new P bias voltage as the P bias voltage; or
if the new P bias voltage is greater than a maximum of the third voltage threshold range, use a difference between the new P bias voltage and an even multiple of the P half-wave voltage as a new P bias voltage, and perform the step of using the new P bias voltage as the P bias voltage.

\* \* \* \* \*